US012350810B2

(12) United States Patent
Hanlon

(10) Patent No.: US 12,350,810 B2
(45) Date of Patent: Jul. 8, 2025

(54) WORK STAND AND WORK STAND FEATURES

(71) Applicant: Perfect Site LLC, Las Vegas, NV (US)

(72) Inventor: Jared W. Hanlon, Las Vegas, NV (US)

(73) Assignee: Perfect Site LLC, Las Vegas, NV (US)

( * ) Notice: Subject to any disclaimer, the term of this patent is extended or adjusted under 35 U.S.C. 154(b) by 0 days.

(21) Appl. No.: 17/729,683

(22) Filed: Apr. 26, 2022

(65) Prior Publication Data

US 2022/0314427 A1 Oct. 6, 2022

Related U.S. Application Data

(63) Continuation-in-part of application No. 17/068,753, filed on Oct. 12, 2020, now Pat. No. 11,648,659.

(60) Provisional application No. 63/179,826, filed on Apr. 26, 2021, provisional application No. 62/913,709, filed on Oct. 10, 2019.

(51) Int. Cl.
*B25H 1/00* (2006.01)

(52) U.S. Cl.
CPC .................................. *B25H 1/0042* (2013.01)

(58) Field of Classification Search
CPC .......... B25H 1/0042; B25H 1/06; B25H 1/08; B25H 1/10; B25H 1/04; A47B 96/1466
See application file for complete search history.

(56) References Cited

U.S. PATENT DOCUMENTS

| | | | | | |
|---|---|---|---|---|---|
| 4,974,651 | A * | 12/1990 | Carmon | B25H 1/04 | 144/287 |
| 5,592,981 | A * | 1/1997 | Derecktor | B25H 1/06 | 144/287 |
| 6,173,660 | B1 * | 1/2001 | Emmert | B25H 1/06 | 108/90 |
| 6,464,180 | B2 | 10/2002 | Workman | | |
| 6,745,804 | B2 * | 6/2004 | Welsh | B25H 1/10 | 144/286.5 |
| 7,185,738 | B1 * | 3/2007 | Clepper | B25H 1/06 | 182/155 |
| 7,210,510 | B2 * | 5/2007 | Barclay deTolly | B25H 1/06 | 144/286.5 |
| 7,418,907 | B2 * | 9/2008 | Haimoff | B25H 1/12 | 108/115 |
| 7,448,608 | B2 * | 11/2008 | Radermacher | B23D 47/025 | 269/139 |
| 8,191,486 | B2 * | 6/2012 | Apps | B65D 19/38 | 108/57.25 |
| 8,684,052 | B2 | 4/2014 | Breitenbach | | |
| 10,093,016 | B2 * | 10/2018 | Ursell | B25H 1/04 | |
| 10,093,017 | B2 | 10/2018 | Bimbaum | | |
| D882,824 | S | 4/2020 | Hanlon | | |
| 11,648,659 | B2 | 5/2023 | Hanlon | | |

(Continued)

*Primary Examiner* — Eric J Rosen
*Assistant Examiner* — Christopher Soto
(74) *Attorney, Agent, or Firm* — Snell & Wilmer L.L.P.

(57) ABSTRACT

A work support includes a pair of support legs, a first elongated rail and a second elongated rail each extending between and being coupled to the pair of support legs and spaced apart from one another, and an extendable workpiece support comprising a third elongated rail and a material support supported by the third elongated rail. The material support is movable laterally and axially relative to the third elongated rail. The third elongated rail is axially movable between extended and retracted positions.

9 Claims, 27 Drawing Sheets

(56) References Cited

U.S. PATENT DOCUMENTS

| | | | | |
|---|---|---|---|---|
| 2004/0124036 | A1 | 7/2004 | Ulshafter, Jr. | |
| 2006/0226311 | A1 | 10/2006 | Radermacher | |
| 2008/0110529 | A1 * | 5/2008 | Breitenbach | B25H 1/06 144/287 |
| 2010/0107838 | A1 | 5/2010 | Berg | |
| 2010/0288585 | A1 * | 11/2010 | Katz | B25H 1/06 182/155 |
| 2011/0198477 | A1 * | 8/2011 | Bergmann | B23D 47/02 248/163.1 |
| 2014/0182443 | A1 | 7/2014 | Bokelaar | |
| 2019/0168374 | A1 * | 6/2019 | Hanlon | B25H 1/04 |

* cited by examiner

FIG. 8B
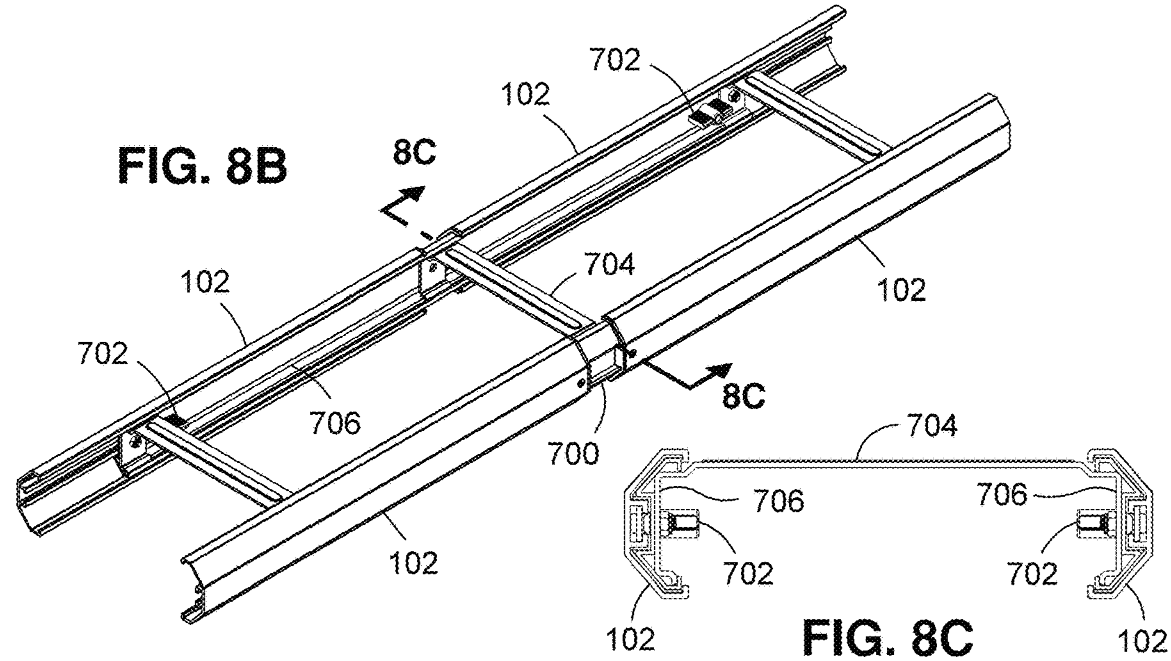
FIG. 8C
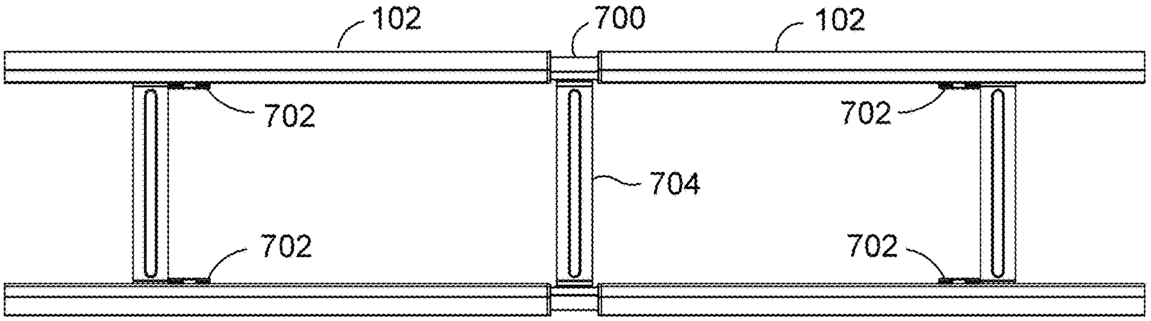
FIG. 8D
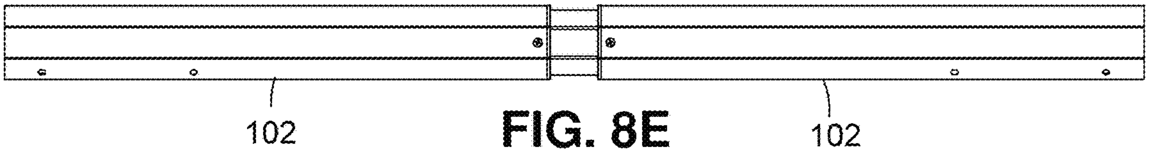
FIG. 8E
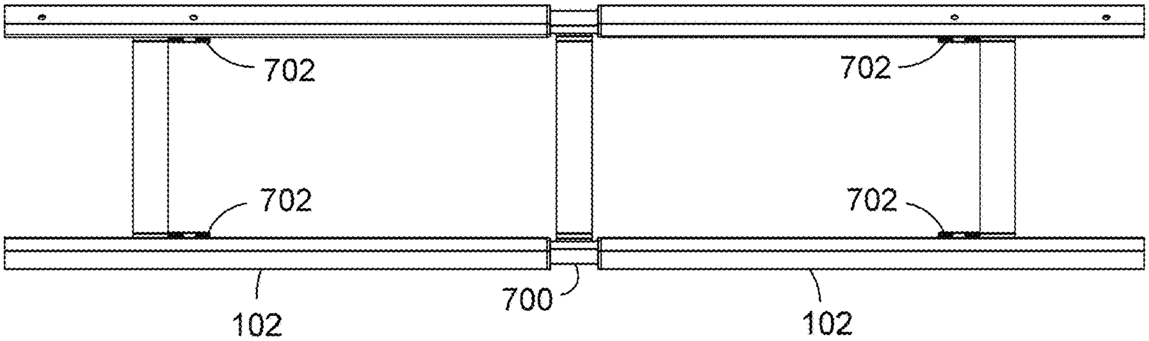
FIG. 8F

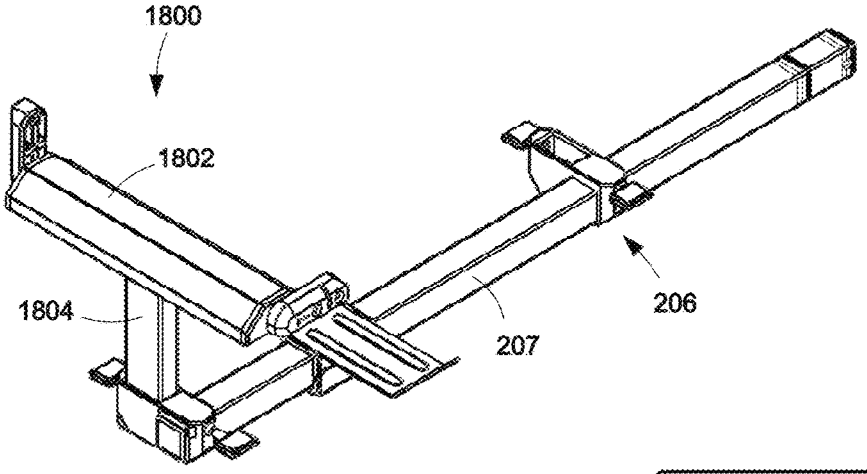
FIG. 18A
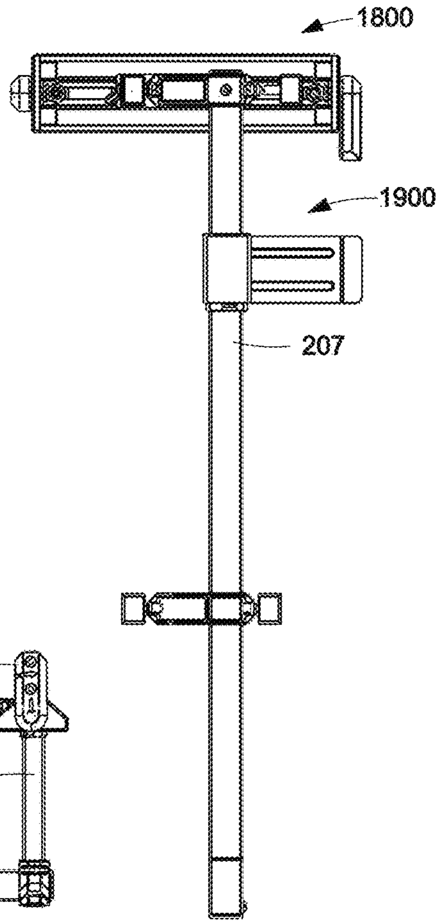
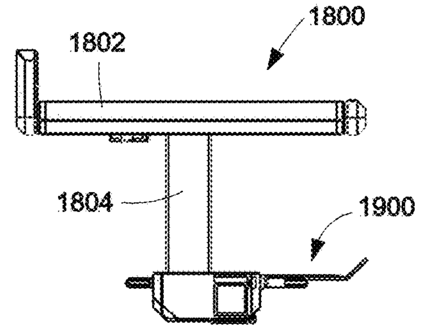
FIG. 18B
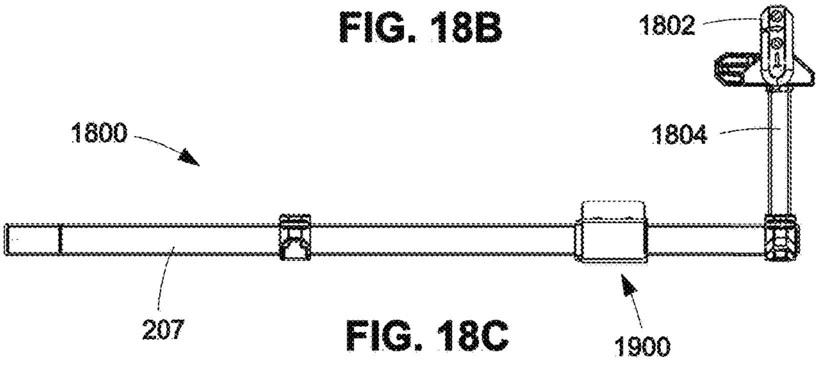
FIG. 18C
FIG. 18D

WORK STAND AND WORK STAND FEATURES

RELATED APPLICATION DATA

This application is a continuation-in-part of U.S. application Ser. No. 17/068,753, filed Oct. 12, 2020, which claims priority to U.S. Provisional Application Ser. No. 62/913,709, filed Oct. 10, 2019, and further claims priority to U.S. Provisional Application Ser. No. 63/179,826, filed Apr. 26, 2021. The present application incorporates each of said applications in their entirety herein by reference.

FIELD OF THE INVENTION

This invention relates to work stands, and more particularly relates to portable work stands that are adaptable for many uses.

BACKGROUND OF THE INVENTION

Work support stands are generally used for supporting, cutting, or shaping work pieces such as construction lumber, and other materials. Some work support stands are portable and configurable for supporting power tools, or functioning as a sawhorse. A support assembly includes supports for connecting the power tool to the work support stand. Miter saws are one such power tool that are often used with work support stands. The work support stand typically positions the miter saw at a height that matches the user's upper body so that the user does not have to kneel to use the miter saw. Many work support stands offer this functionality, but often times the mechanisms to support the features of portability and securely mounting the miter saw result in a bulky work support stand that is difficult to ship, display, and store once purchased.

SUMMARY OF THE INVENTION

Disclosed is a work support having a pair of support legs, a first elongated rail and a second elongated rail each extending between and being coupled to the pair of support legs and spaced apart from one another, and an extendable workpiece support comprising a third elongated rail and a material support supported by the third elongated rail. The material support is movable laterally and axially relative to the third elongated rail. The third elongated rail is axially movable between extended and retracted positions.

In accordance with another aspect of the disclosed concept, a work support comprises a pair of support legs; a first elongated rail and a second elongated rail each extending between and being coupled to the pair of support legs and spaced apart from one another; and a tool mount comprising: a body for supporting at least one tool, the body spanning the first and second elongated rails and being oriented transverse with respect thereto, a first engagement member and a second engagement member each coupled to the body, and a drive mechanism coupled to the body. The drive mechanism is structured to move at least one of the first and second engagement members into engagement with an interior of a corresponding one of the first and second elongated rails in a press fit manner in order to mount the tool mount to the first and second rails.

Further objects, features, and advantages of the present invention over the prior art will become apparent from the detailed description of the drawings which follows, when considered with the attached figures.

DESCRIPTION OF THE DRAWINGS

FIGS. 8B-8F illustrates another example of slidable rails in accordance with another embodiment of the present disclosure;

FIGS. 18A-18F illustrate aspects of an adjustable material support in accordance with an embodiment of the present disclosure;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
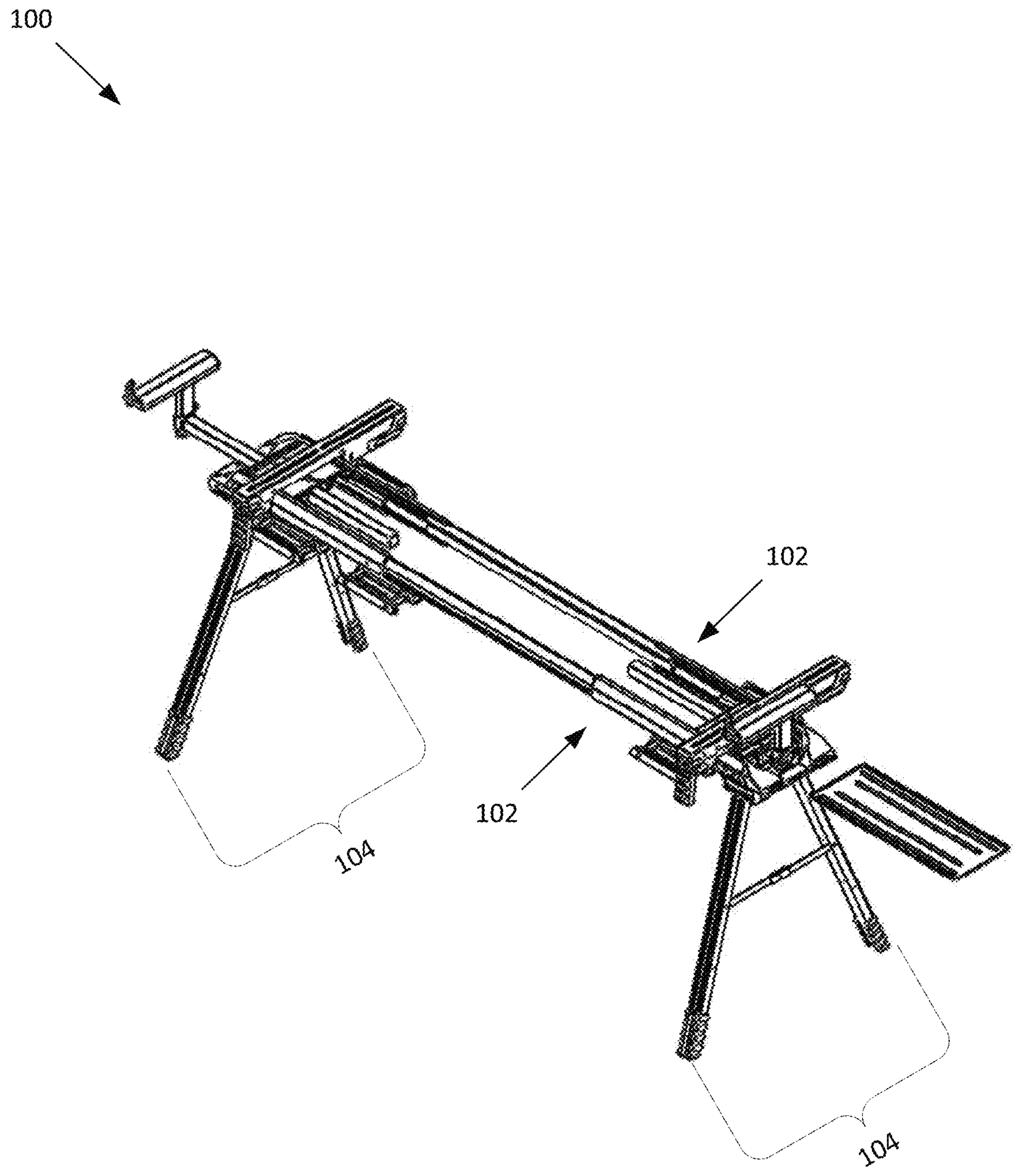
FIG. 1 is a perspective view diagram illustrating one embodiment of a work support in accordance with examples of the present disclosure.

FIG. 1 is a perspective view diagram illustrating one embodiment of a work stand or work support 100 in accordance with examples of the present disclosure. The work support 100, as will be discussed in greater detail below, is configurable for many uses, including but not limited to, a miter saw stand, a low-profile miter saw stand, a sawhorse, a work piece support, and a clamping table. The work support 100, in certain embodiments, is manufactured of a combination of metal and/or plastic components. In particular, support beams (formed of one or more rails 102) that extend between pairs of legs 104, may be aluminum (or an alloy thereof) and extruded (or which might be formed from PVC or ABS extruded channel). In one configuration, the rails 102 are spaced apart a distance that allows for the legs 104 to collapse and fold in between the rails 102. This beneficially allows for the entire work support 100 to be packaged efficiently, shipped in a small configuration and displayed neatly on a store's shelves.

Figure 2:
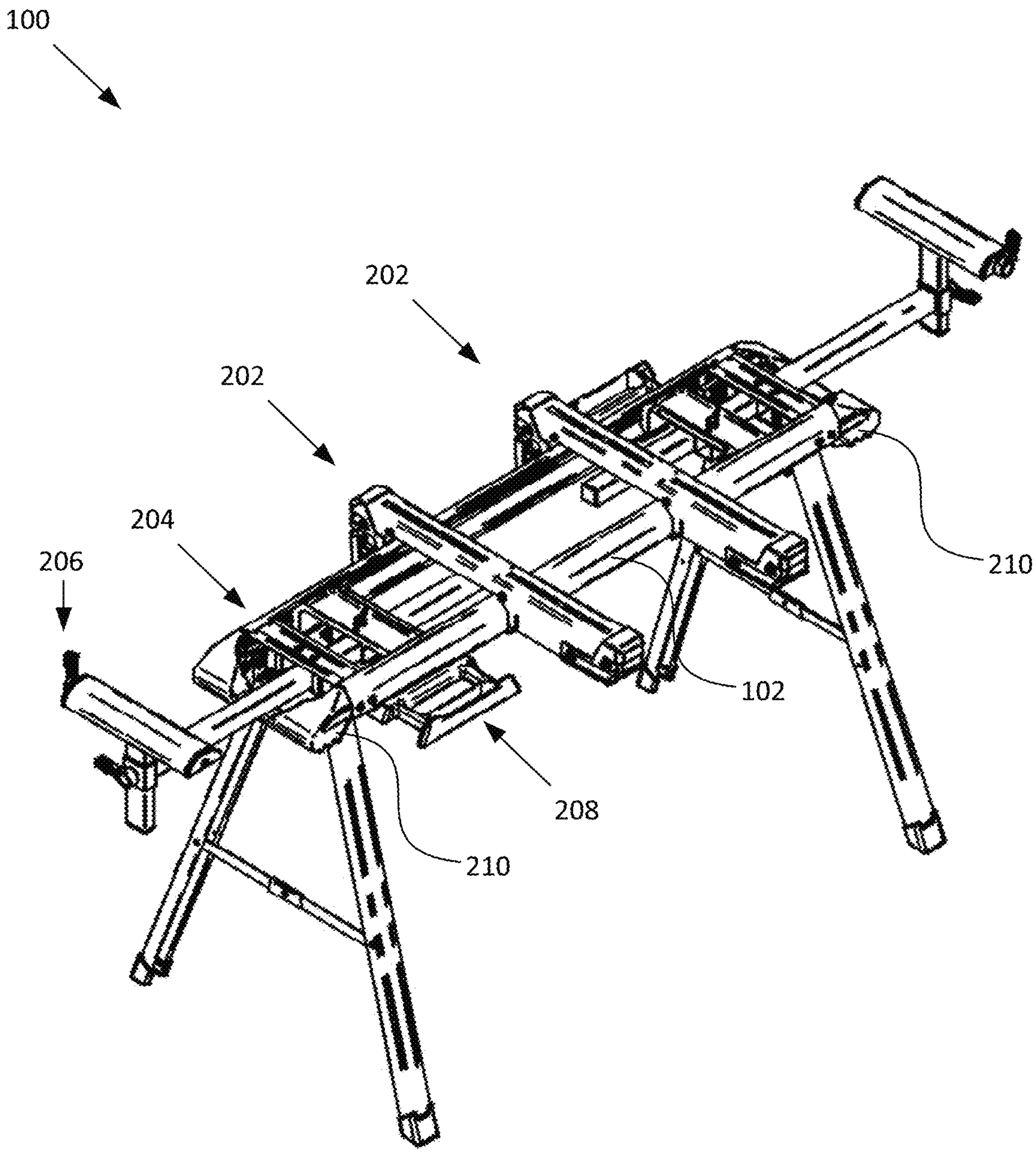
FIG. 2 is another perspective view diagram illustrating one embodiment of the work support in accordance with examples of the present disclosure.

FIG. 2 is another perspective view diagram illustrating one embodiment of the work support 100 in accordance with examples of the present disclosure. In certain embodiments, the rails 102 are configured to receive removable saw mounts 202. In other embodiments, the saw mounts 202 are configured to couple with other tools including, but not limited to, grinders, sanders, portable table saws, planers, etc. The saw mounts 202 are configured with an inner jaw that mates to an exterior surface of a rail (see FIG. 9, see also 102 of FIG. 1). A lever of the saw mount 202 engages the inner jaw and causes the inner jaw to clamp onto one or both of the rails 102.

Also depicted in FIG. 2, is a leg mount 204. In certain embodiments, the leg mount 204 (see also FIG. 14) couples to interior surfaces of the rails 102 and rotatably couples the legs 104 to the leg mount 204. The leg mount 204, as will be described below in greater detail with reference to FIG. 3, includes openings for receiving a slidable workpiece support 206. The leg mount 204 couples to the rails 102 and torsionally stiffens the work support 100.

The work support 100, in certain embodiments, includes side handles 208 and end handles 210. The side handles 208 extend outward laterally from one of the rails 102 and may be coupled to a bottom surface of the rail 102 with fasteners (not shown). The end handles 210 may engage both of the rails 102 and, in certain embodiments, insert into a channel formed by the rails 102. Fasteners may secure each end handle 210 to the rails 102.

Figure 3:
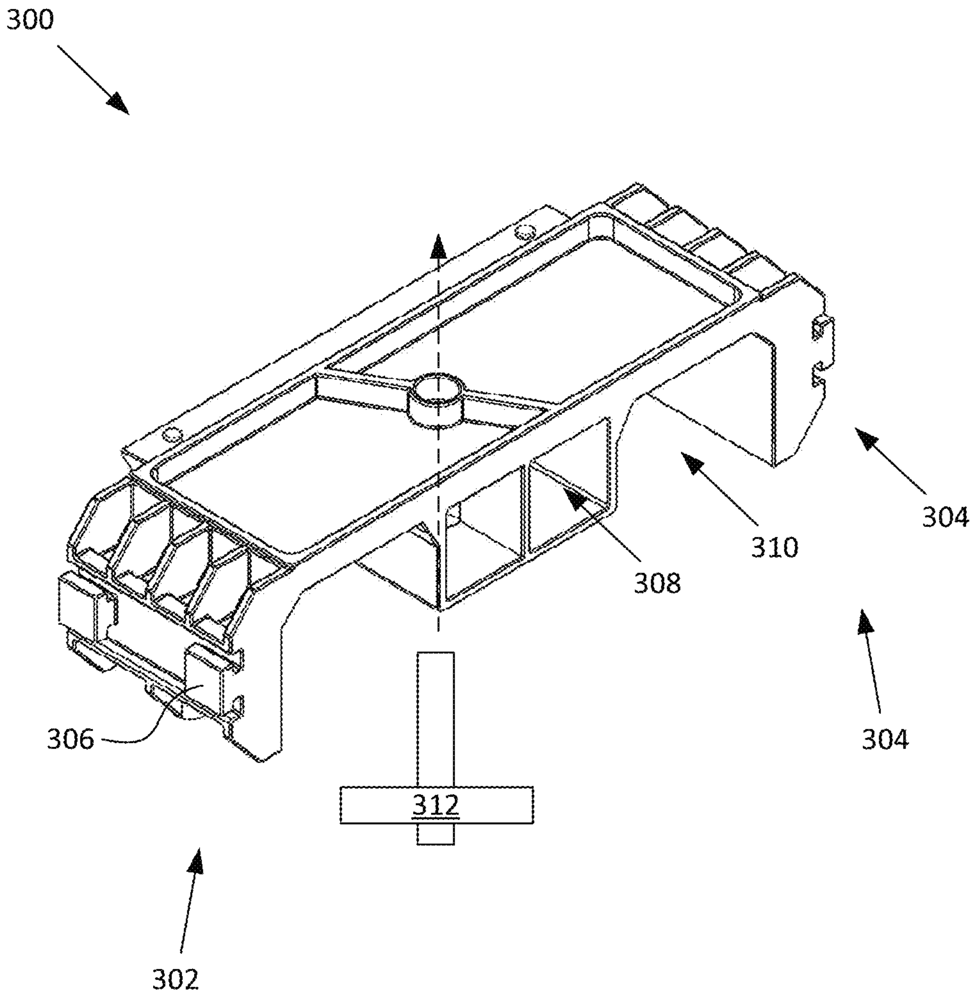
FIG. 3 is a perspective view diagram illustrating one embodiment of a leg bracket in accordance with embodiments of the present disclosure.

FIG. 3 is a perspective view diagram illustrating one embodiment of a leg bracket 300 in accordance with embodiments of the present disclosure. The leg bracket 300, in certain embodiments, may be formed of a durable polymer material, or alternatively, a metal alloy. The leg bracket 300 extends transversely between the rails 102 from a first end 302 to a second end 304. Each end 302, 304 of the leg bracket 300 is formed to mate with the interior surface of the rail 102. In the depicted embodiment, this shape is generally a C-shape and includes a T-member or protrusion 306 that mates with a T-shaped channel in the rail. It is contemplated that other shapes may be implemented that slidingly lock one end of the leg bracket 300 to one of the rails 102.

In certain embodiments, the leg bracket 300 includes openings 308 for the workpiece support 206 (e.g., an extendable workpiece support) to pass through the leg bracket. Additionally, the leg bracket 300 includes leg channels 310 for receiving and securing the legs 104 when the legs are in a collapsed, storage position. A rotatable butterfly handle 312 with a twist-lock mechanism secures the legs 104 in the storage position. The rotatable butterfly handle 312 is also configured to lock the slidable workpiece support 206 in any position between a fully extended position and a fully retracted position. This may be accomplished with an off-set cam inside the butterfly handle 312 that engages the workpiece support 206 and prevents movement.

Figure 4:
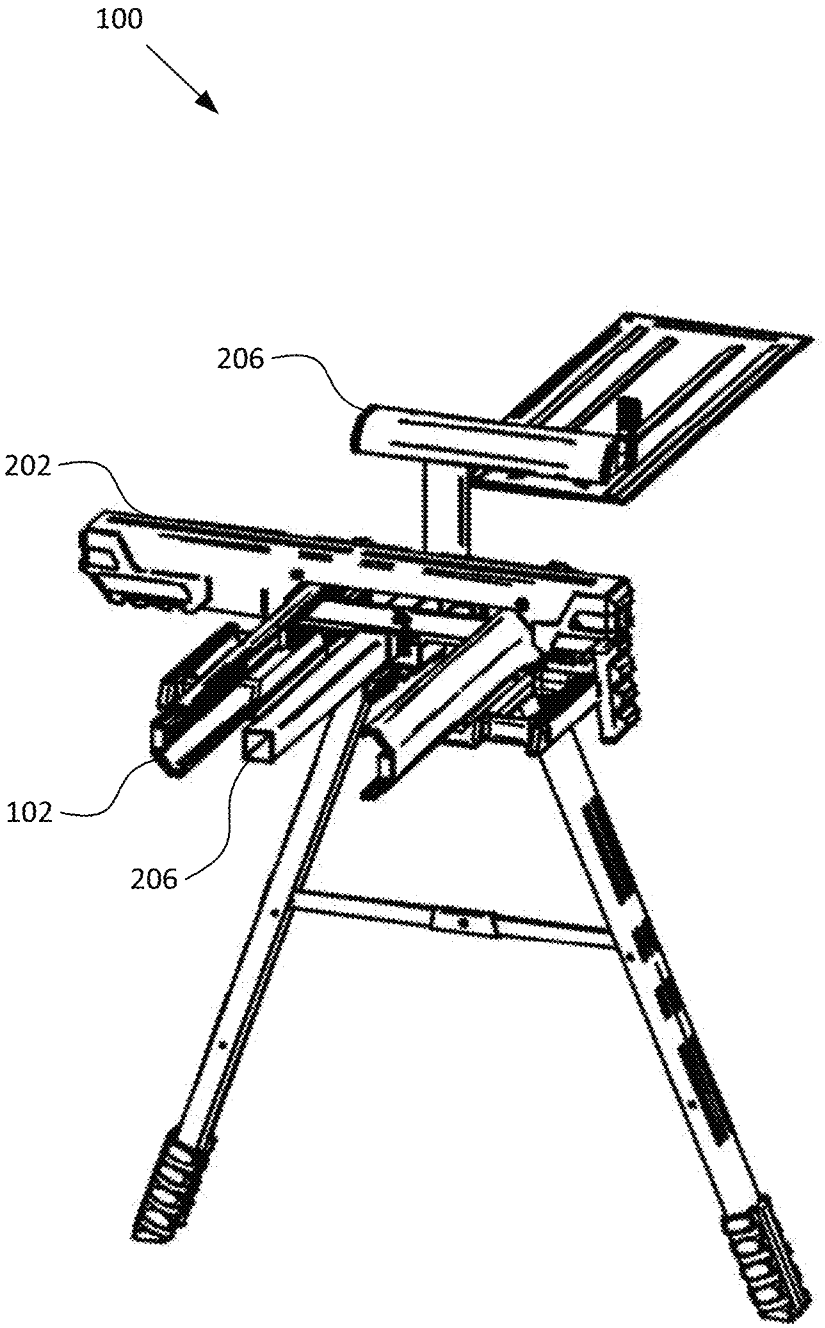
FIG. 4 is a cross-sectional perspective view diagram illustrating one embodiment of the work support in accordance with embodiments of the present disclosure.

FIG. 4 is a cross-sectional perspective view diagram illustrating one embodiment of the work support 100 in accordance with embodiments of the present disclosure. As depicted, the rails 102 have a C-shaped cross-sectional profile that may be formed of extruded aluminum. The workpiece support 206 is configured to slide into and out of the work support 100 to accommodate different length boards. In certain embodiments, the rails are extendable. In alternative embodiments, the rails are of fixed length.

Figure 5:
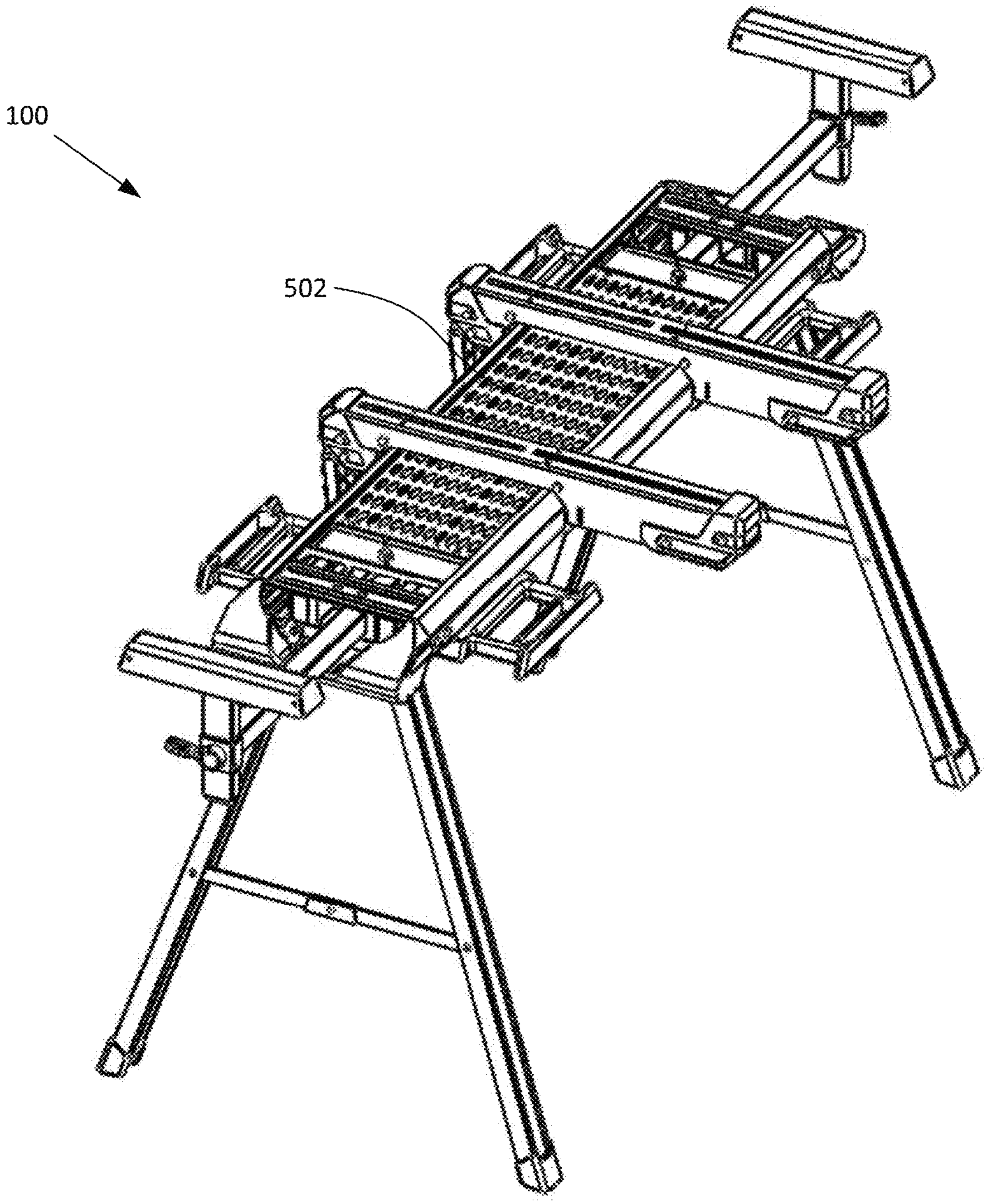
FIG. 5 is a perspective view diagram illustrating another embodiment of the work support in accordance with embodiments of the present disclosure.

FIG. 5 is a perspective view diagram illustrating another embodiment of the work support 100 in accordance with embodiments of the present disclosure. The work support 100, in the depicted embodiment, may include a removable work surface 502. The work surface 502, in certain embodiments, is formed of sheet metal (but might be formed of plastic) and includes an array of openings. The openings are useful for many operations, including attachment of clamping devices, etc. The work surface 502 may also be utilized as a welding table, or as a simple work surfaces, such as to place tools on while other work is being performed. Beneficially, the rails 102 are spaced apart a distance selected to accommodate multiples of pieces of lumber, for example, two 2×4 pieces, as will be described in greater detail below.

Figure 6A:
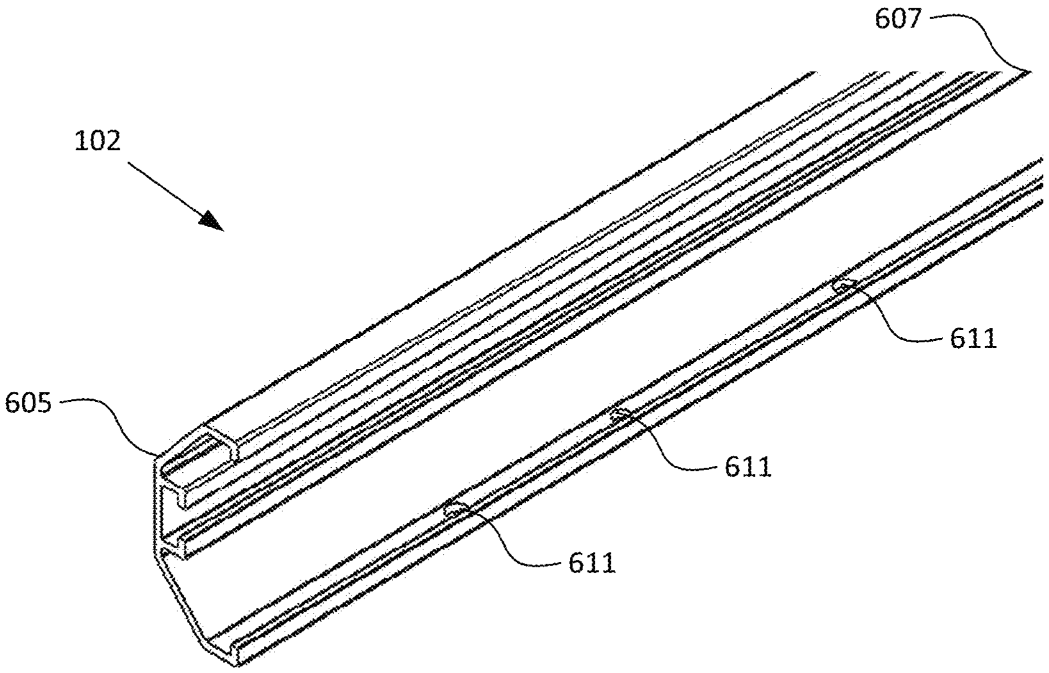
FIGS. 6A and 6B depict the cross-sectional profile of the rails, in accordance with embodiments of the present disclosure.
Figure 6B:
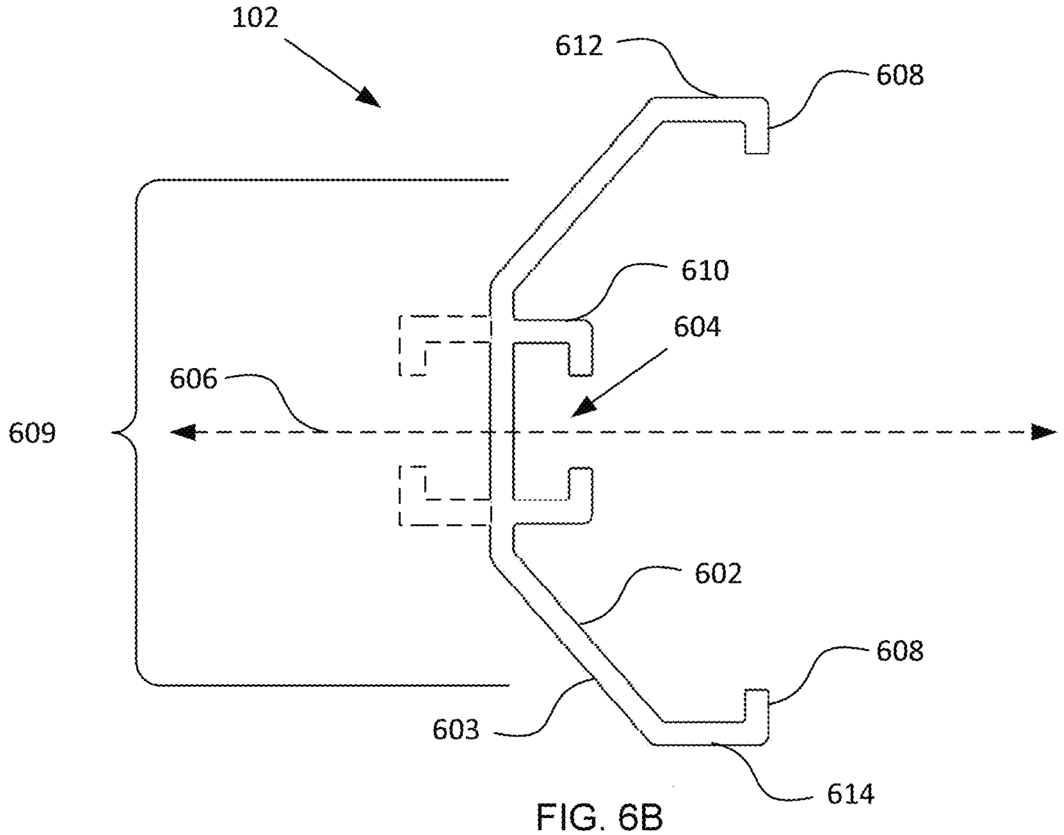

FIGS. 6A and 6B depict the cross-sectional profile of the rails 102, in accordance with embodiments of the present disclosure. In certain embodiments, the cross-sectional profile of each rail 102 is generally C-shaped. However, other cross-sectional profiles are contemplated (see FIG. 17A-E). An interior surface 602 of the rail 102, in certain examples, includes a T-channel or track 604. The T-track 604 is useful for laterally securing brackets, members, etc., to the rail 102. As used herein, a longitudinal axis refers to an axis that extends from one end of the rail to the opposing end of the rail, and a lateral axis 606 extends outward laterally in a direction generally perpendicular to the longitudinal axis. As such, extending laterally from the rail 102 refers to extending in a direction along the lateral axis 606.

The T-track 604 is formed of members 610 that extend laterally from the interior surface 602 of the rail 102. In other examples, the thickness of the rail 102 is increased and the T-track 604 is formed within that thickness. Other geometric shapes are contemplated that allow for the movement of a component longitudinally along the rail, but that prevent lateral movement. An upper edge 612 and a lower edge 614 of the rail 102, in certain embodiments, include an inwardly extending member 608. Stated differently, each edge of the C-shape cross-sectional profile has a serif-like projection that extends toward the extending member 608 of the opposing edge. These inwardly extending members 608 are useful for locking components, such as a low-profile tool mount, as will be described below in greater detail (see FIG. 9). Alternatively, the C-shaped profile terminates at each edge 612, 614 with members that extend substantially coaxially.

Disposed between the upper edge 612 and the lower edge 614 is a middle portion 609. The middle portion 609 extends between the upper edge 612 and the lower edge 614, and forms the interior surface 602 and the exterior surface 603. The t-track 604 may be formed on one or more of the interior surface 602 or the exterior surface. The rail 102, in certain examples, has a first end 605 and a second end 607. The T-track 604 may extend from the first end 605 to the second end 607. In other examples, the T-track 604 extends from an area near the first end 605 to an area near the second end 607

In a further embodiment, openings 611 are formed in the surface of the rail 102 for mounting components, such as the side handles 208 and end handles 210. The openings 611, in certain examples, receive fasteners, or alternatively, protrusions from the component that mate to the rail 102.

In certain examples, the T-track 604 may be formed on the exterior surface of the rail 102, as depicted by the dotted lines. This, beneficially, allows for the attachment of various accessories, including, but not limited to, moveable/slidable handles, flip-up top, clamping bench, etc.

Figure 7:
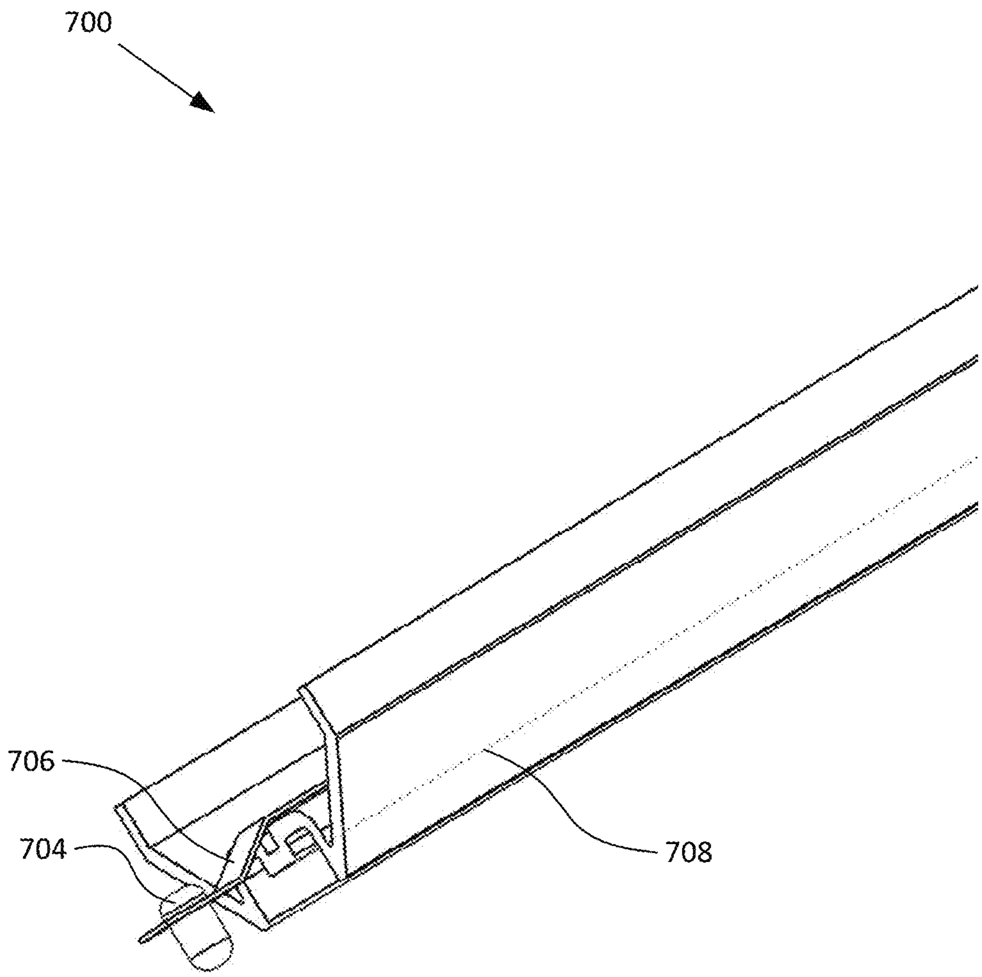
FIG. 7 is a perspective view diagram illustrating one embodiment of a central member of an extendable rail system in accordance with embodiments of the present disclosure.

FIG. 7 is a perspective view diagram illustrating one embodiment of a central member 700 of an extendable rail system in accordance with embodiments of the present disclosure. The central member 700 allows the rails 102 to be cut into smaller segments and be assembled together. This is advantageous for shipping and packaging reasons, as full length rails might otherwise take up excessive space. The extendable central member 700, in certain examples, is formed with a generally C-shaped cross-sectional profile configured to engage an interior surface of the rail 102. The central member 700, in certain examples, includes a fastener for securing the central member 700 to one of the rails 102. In certain examples, the fastener is a screw, or alternatively a depressible detent 704 that is biased by a mounting member 706. The detent 704 is configured to pop into an opening in the rail and prevent the rail 102 from sliding past the end of the central member 700.

The central member 700 engages the interior surface of an extendable rail 102 and also an adjacent extendable rail 102. As such, the central member 700 slidingly engages a pair of rails 102 to coaxially align the rails 102. In FIG. 7, reference number 708 depicts the longitudinal axis.

Figure 8A:
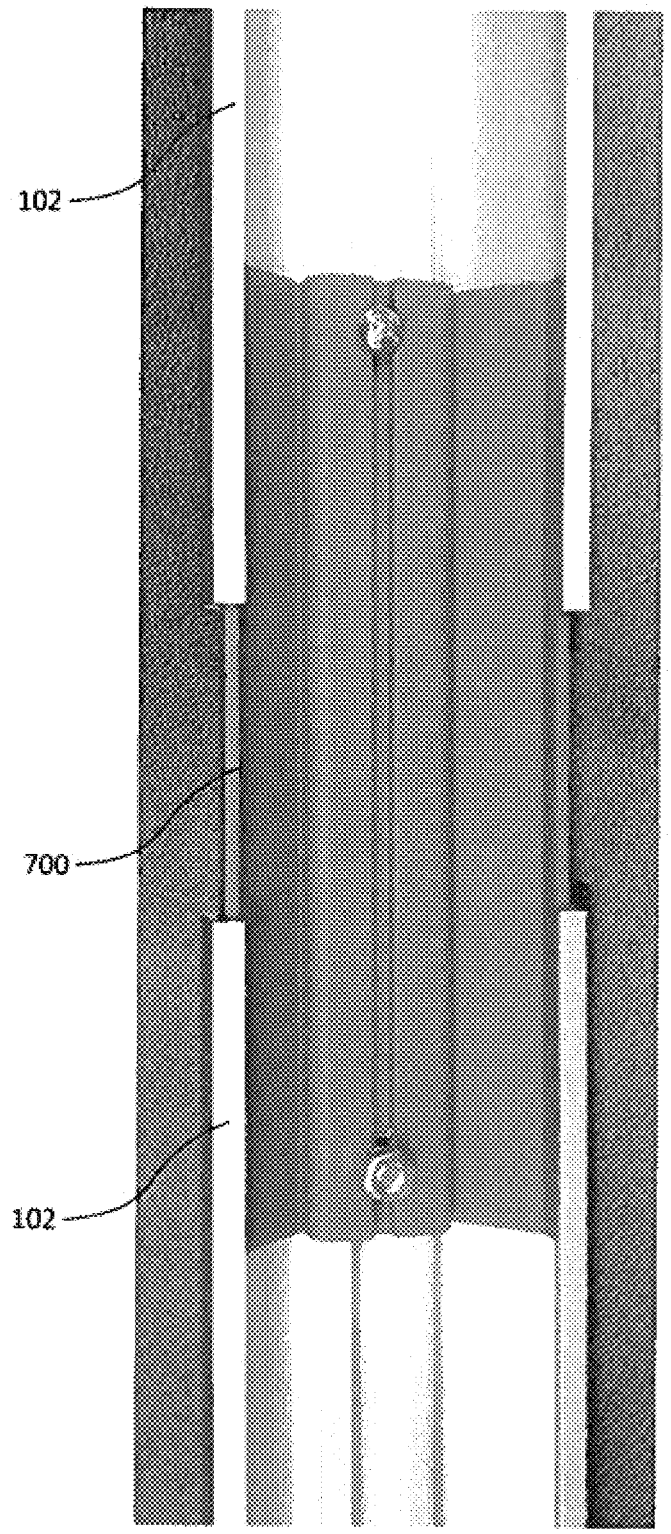
FIG. 8A is a side view diagram illustrating one example of slidable rails in accordance with examples of the present disclosure.

FIG. 8A is a side view diagram illustrating one example of slidable rails 102 in accordance with examples of the present disclosure. The central member 700 engages and coaxially aligns a pair of adjacent rails 102. The central member 700, in certain examples, includes fasteners that engage the T-track 604 of the rails. As depicted, the central member 700 is formed of a resilient polymer material, such as ABS and/or PVC, while the rails 102 are formed of an extruded aluminum allow. In other examples, the central rail 700 is formed of the same material as the rails 102.

FIGS. 8B-8F illustrate another embodiment of slidable rails 102 with a central member 700 in accordance with the invention. As illustrated, one or more fasteners 702 are associated with the central members 700 which are associated with the rails 102 at each side of the stand. In one embodiment, a fastener 702 may be located at each end of each of the central members 700. Each fastener 702 is preferably movable from a disengaged position in which the fastener 702 does not engage the associated rail 102, and an engaged position in which the fastener 702 engages the associated rail 102, such as at the T-track thereof.

In one embodiment, the fastener 702 may be a threaded fastener which passes through the central member 700. As illustrated, a head end of the fastener 702 may be configured as or include a paddle (e.g. a generally planar body which extends outwardly from the fastener 702 in opposing directions) for engagement (and twisting/rotation) by a user).

In use, the user may loosen the fasteners 702 that correspond to the central member 702 at either or both ends of the stand, thus allowing the corresponding rails 102 to be slid in and out relative to the central member 700. The user may tighten the fasteners 702 in order to lock the rails 102 to the central member 700, thus securing them in a desired position (e.g. thus fixing the stand to a desired length).

As illustrated, the central member 700 may comprise a pair of legs 706 which are connected at one or more locations body a cross-support 704. The cross-support(s) 704 may serve to stabilize the two rails 102 by spanning the space between the two rails 102. Preferably, the legs 706 are configured to fit into the "C" shaped portion of the rails 102. In this configuration, the legs 706 fit tightly into the rails 102, thus aiding in twisting of the rails 102. In this manner, the rails 102 may be broken down, such as to make them shorter for shipping and storage (by removing them from the central member 700), but when the rails 102 are connected to the central member 700, the rails form strong, elongate supports for the work support 100. Further, where the central member 700 has elongate legs 706, the total length of the work support 100 may be varied by changing the mounting location of the rails 102 to the central member 700 (such as by moving the rail portions at either side of the central member 700 towards or away from one another).

It will be appreciated that a number of rail sections might be attached to one another by one or more central members as described above, such as depending upon the desired total size of the work support.

Figure 9A:
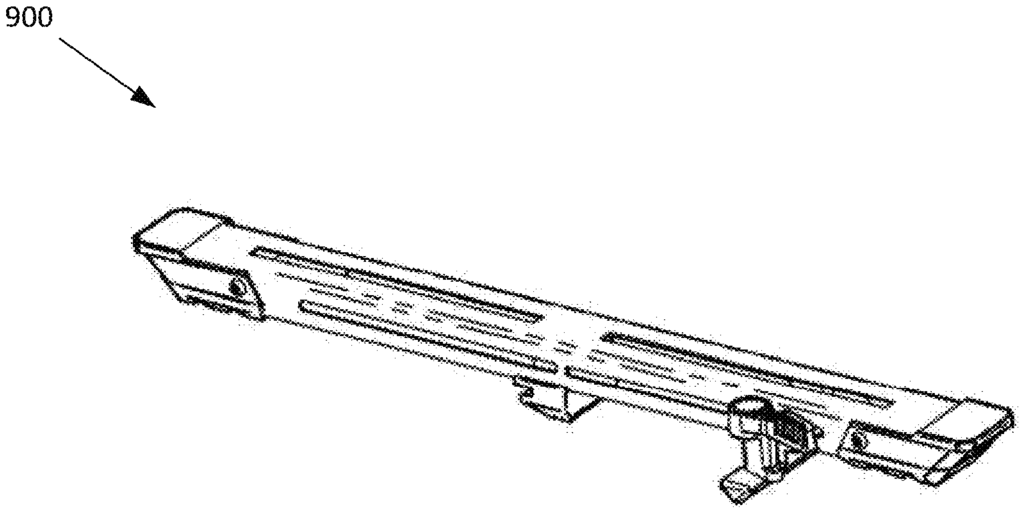
FIGS. 9A and 9B depict embodiments of a low-profile tool mount in accordance with examples of the present disclosure
Figure 9B:
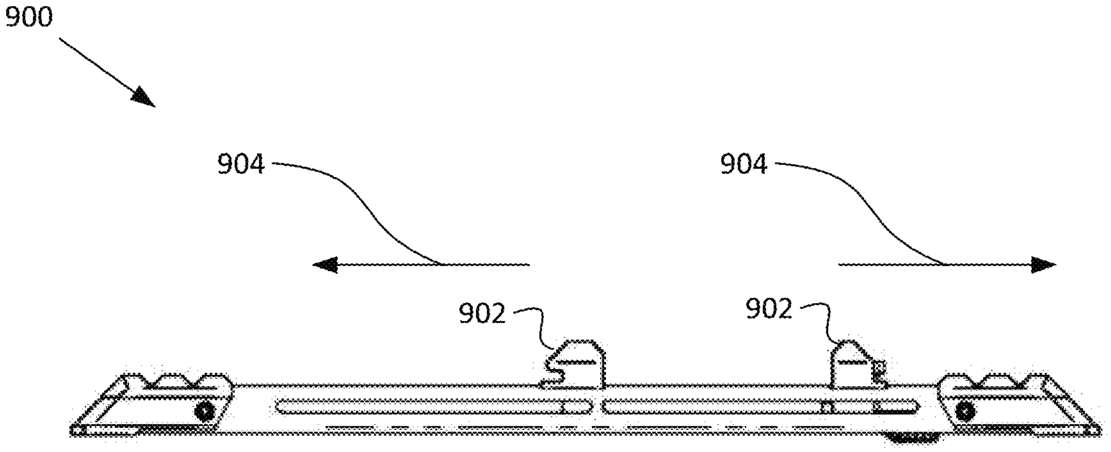

FIGS. 9A and 9B depict embodiments of a low-profile tool mount 900 in accordance with examples of the present disclosure. The low-profile tool mount 900 is configured to couple to the or both of the rails 102, such as an interior surface of the rails 102. In contrast with common tool-mount systems for work supports that mount to the exterior surface of a rail, the low-profile tool mount 900 includes engaging members 902 that provide a clamping force in a direction towards the edges of the tool mount 900, as depicted by arrows 904.

Conversely, common tool mounts provide a clamping force directed inwards that clamps on exterior surfaces of the rails. The engagement members 902 are configured to mate with a portion of the interior surface of the rails 102.

Figure 10A:
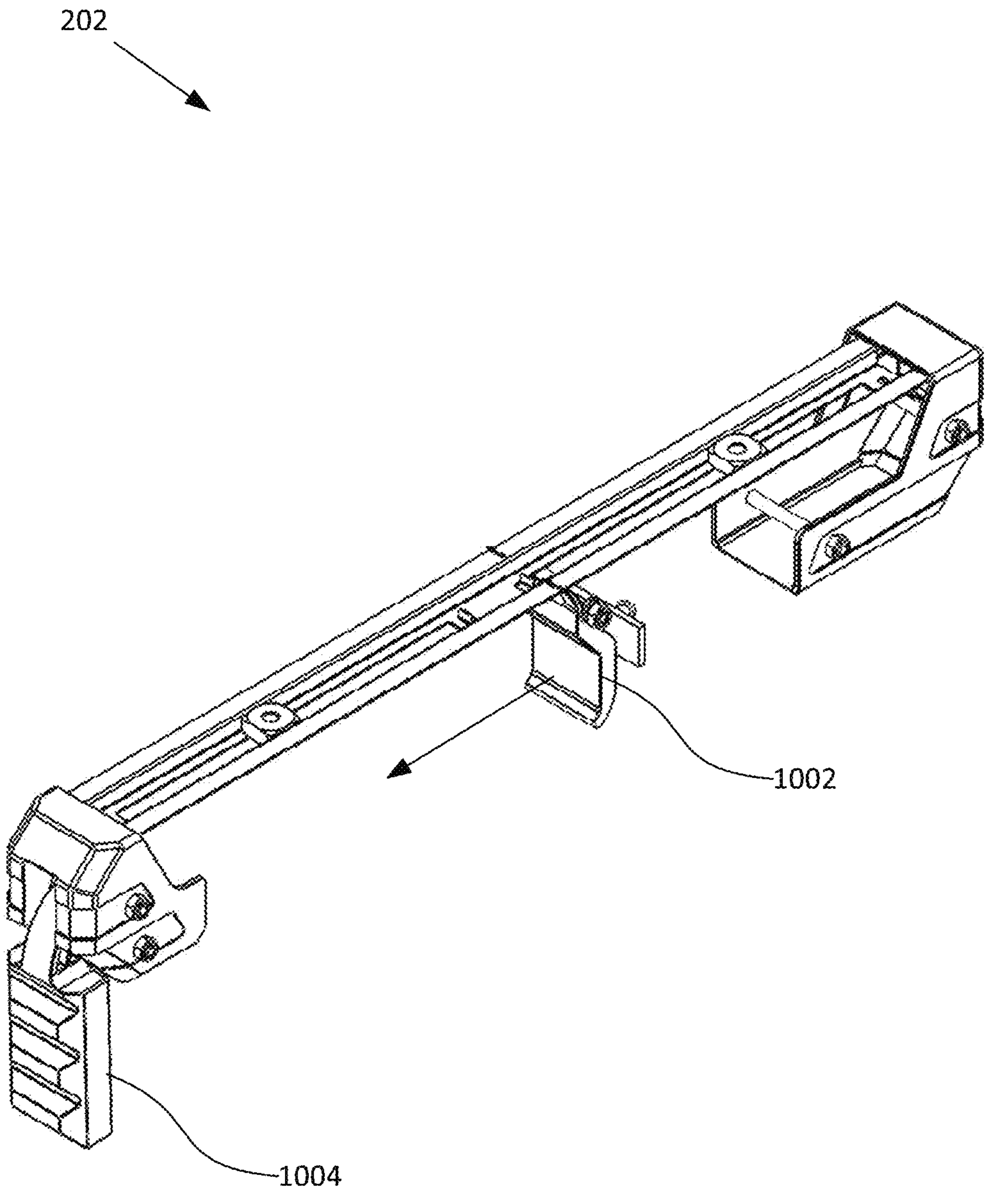
FIG. 10A is a perspective view diagram of a portion of the tool mount in accordance with embodiments of the present disclosure.

FIG. 10A is a perspective view diagram of a portion of the tool mount 202 in accordance with embodiments of the present disclosure. As described above with reference to FIG. 2, the tool mount 202, in certain examples, includes engagement members that mate with exterior surfaces of the rails 102. These engagement members 1002 provide a clamping force that is directed inward, or towards the opposing engagement member (not shown). The engagement members 1002 of the tool mount 202 may include surfaces configured to engage with the exterior surfaces of the rail 102. In the depicted example, the engagement members 1002 include a general C-shape for mating with the exterior surfaces of the rail 102. At least one of the engagement members 1002 is positionable, and lockable in a predetermined location. A lever 1004 may include a cam-type mechanism that creates a clamping force on the rails 102.

Figure 10B:
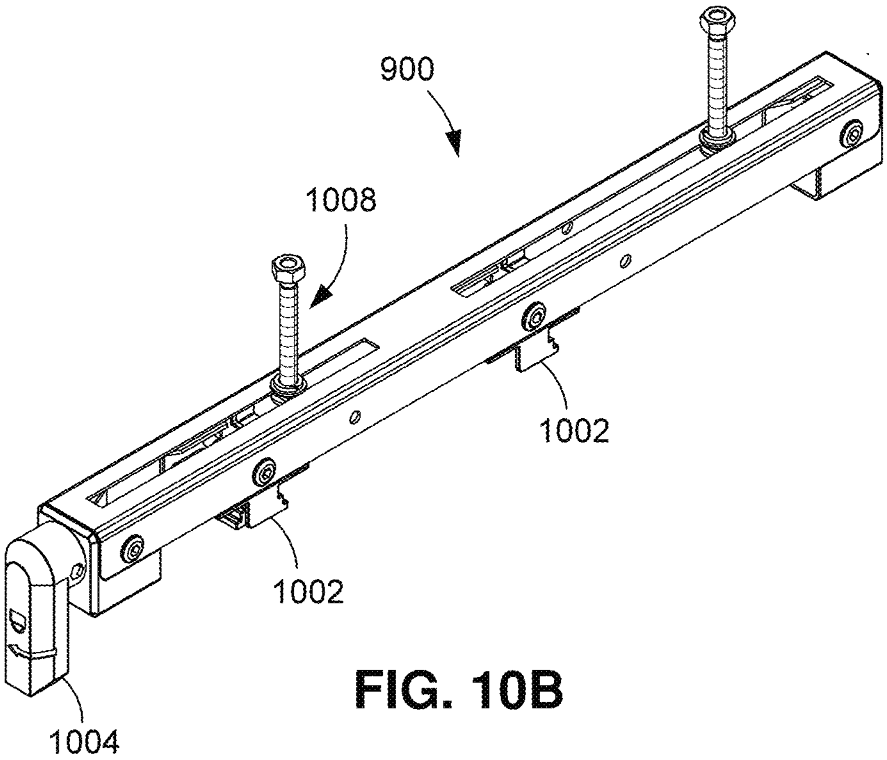
FIGS. 10B-10K illustrate another tool mount in accordance with an embodiment of the present disclosure.
Figure 10C:
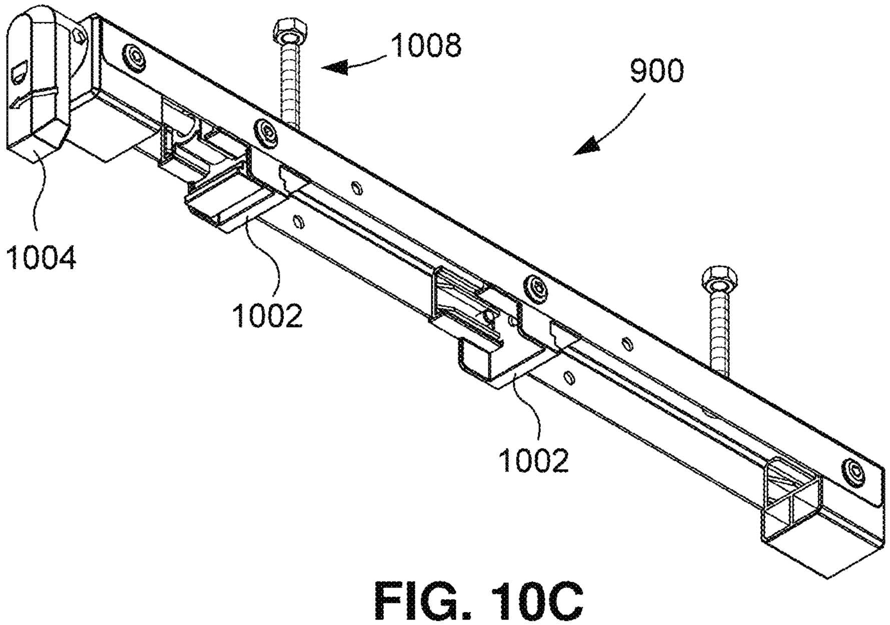
Figure 10D:
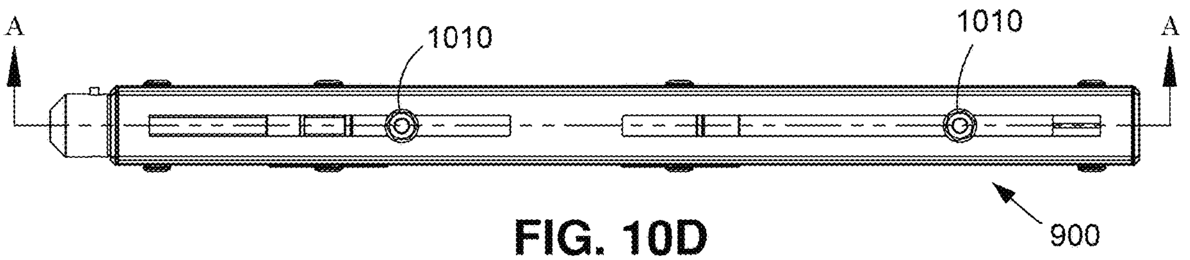
Figure 10E:
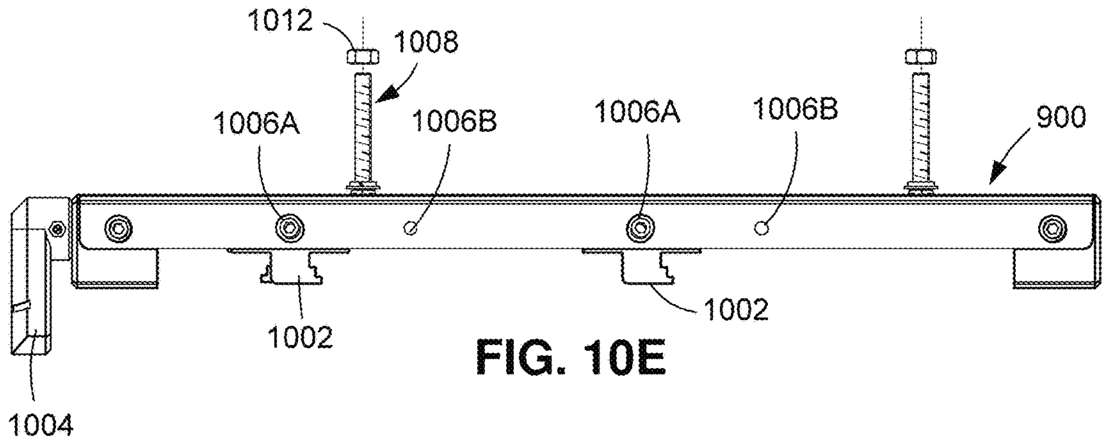
Figure 10F:
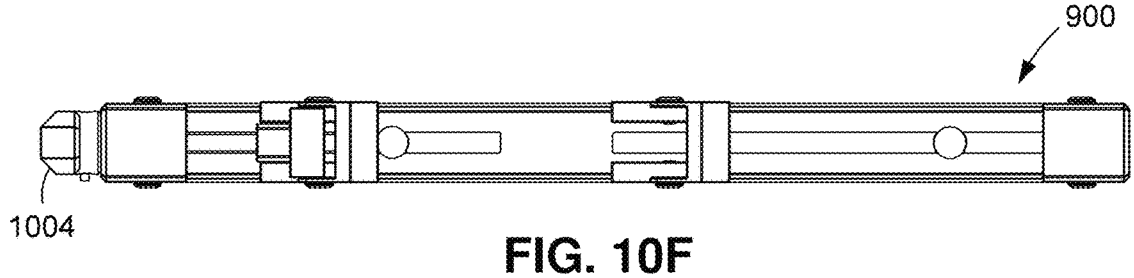
Figure 10G:
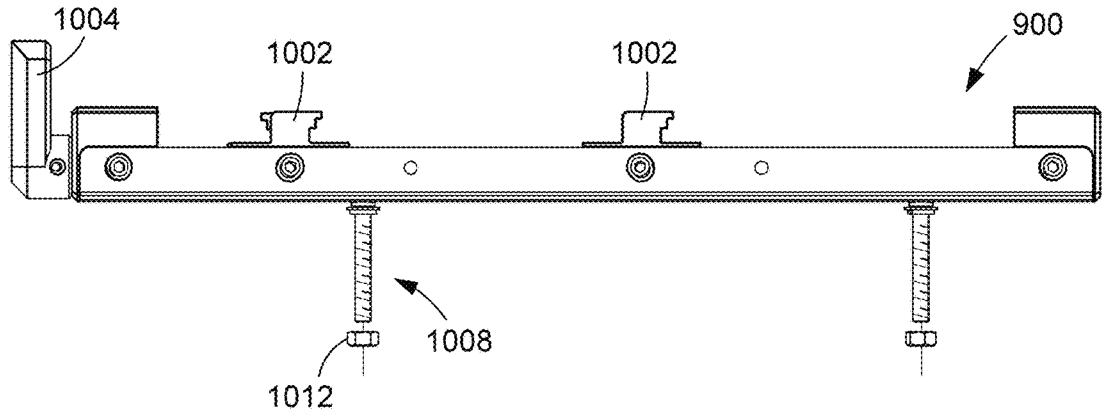
Figure 10H:
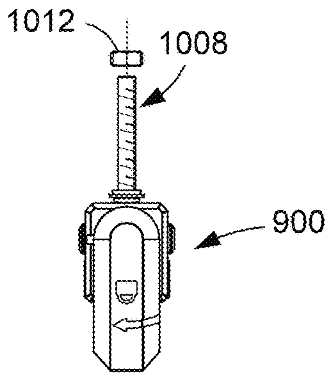
Figure 10I:
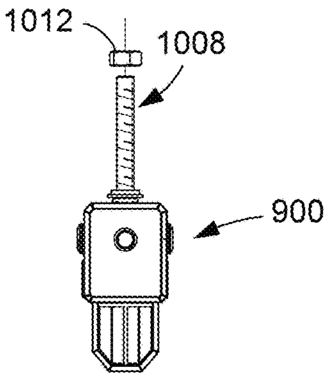
Figure 10J:
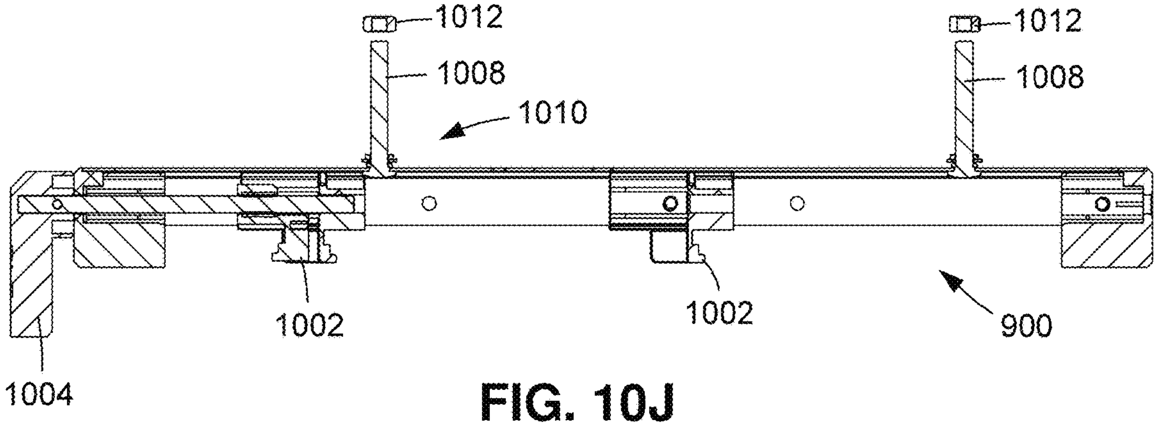
Figure 10K:
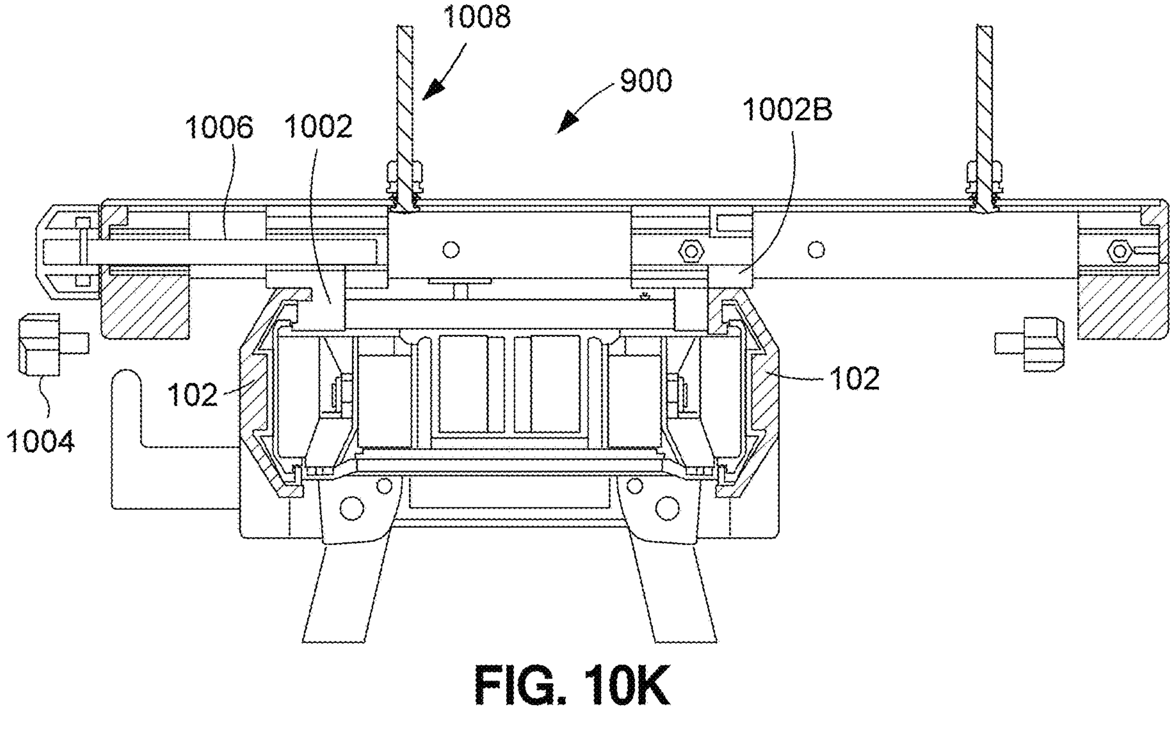

FIGS. 10B-10H illustrate other tool bracket or mount 900 in accordance with the invention. This embodiment mount 900 again comprises a body or support for one or more tools, and one or more movable engagement members 1002. In this embodiment, first and second engagement members 1002 are provided and each engagement member 1002 is configured to engage an inside of one of the rails 102. The engagement members 1002 may have various configurations, including shapes. For example, the engagement members 1002 might comprise pads having one or more faces, such as having profiles for engaging the rails 102. As one example, the engagement members 1002 might define one or more steps or notches for engaging mating portions of the rails 102, such as illustrated in FIG. 10H.

In use, a user places each mount 900 in a desired position on the top of the stand and then slides the engagement members 1002 towards the inside of the opposing rails 102. The user may then engage the lever 1004 in order to secure the engagement members 1002/lock the mount 900 to the rails 102. In this embodiment, the lever 1004 comprises a rotatable lever, but may as indicated above, have other configurations. In this embodiment, the lever 1004 rotates about a generally horizontal axis and can be twisted or rotated to the right (as indicated by the markings on the lever 1004 as illustrated in FIG. 10B) to a locking position, or may be rotated to the left to unlock it. In one embodiment, the lever 1004 may rotate a rod that at least one of the engagement members 1002 is mounted upon, wherein rotation of the rod, at least a portion of which is threaded, pulls the engagement member 1002 towards the lever 1004, compressing the engagement member 1002 against the inside the corresponding rail 102.

FIG. 10C illustrates additional detail of the mount 900, including the engagement members 1002A,B and a drive mechanism which is coupled to the body of the mount 900. The drive mechanism is structured to move at least one of the first and second engagement members 1002 into engagement with an interior of a corresponding one of the first and second elongated rails 102 in a press fit manner in order to mount the tool mount 900 to the first and second rails 102. As illustrated, the drive mechanism includes the lever 1004 and the drive rod 1006 connected to the lever 1004, wherein rotation of the lever 1004 causes rotation of the drive rod 1006. The drive rod 1006 is mounted to one of the engagement members 1002, and rotation of the rod 1006 pulls one of the engagement members 1002 toward the lever 1004, thereby compressing the engagement member 1002 into one of the elongated rails 102 and mounting the tool mount 900 to the first and second elongated rails 102.

In use, the user places the other engagement member 1002B into engagement with the opposing side rail 102. The user then rotates the lever 1004 to rotate the drive rod 1006 to pull or draw the first engagement member 1002A into engagement with the rail 102. In this configuration, the mount 900 engages or locks to the stand, and particularly the rails 102, by engaging the inner sides of the rails 102 and pressing outwardly. Of course, the lever 1004 might be used to move either or both engagement members 1002A,B in other manners, including by a cam configuration, slide-lock configuration or the like.

Of course, other types of drive or biasing mechanisms might be used to move the engagement members 1002. For example, in another embodiment, a biasing member such as a spring might be used to bias the engagement members 1002 outwardly, and a retraction mechanism might be used to move the engagement members 1002 against the biasing force, such as to open or retract them so that the mount 900 may be connected to or disconnected from the rails 102. As another example, the drive mechanism might comprise a gear type element or system or a ladder or toothed configuration where the engagement members 1002 can be freely moved in one direction but then latch or lock, requiring unlocking to be moved (such as to move them out of engagement with the rails 102).

As illustrated, the engagement members 1002 may be mounted to the tool mount 900 in at least two different positions. One position is an "offset" position in which the tool mount 900 is not centered over the rails 102 of the stand (such as illustrated in FIG. 2, wherein the tool mounts 900 extend forwardly past the front rail farther than rearwardly from the rear rail). Another position is a "centered" position in which the tool mount 900 is generally centered over the two rails 102. In one embodiment, this is facilitated by providing at least two different mounting locations for the engagement members 1002, such as a set of "centered" mounting locations 1006B and a set of "offset" mounting locations 1006A (of course, the tool mount 900 might have other mounting locations). Further, in some embodiments, the tool mounts 900 might be position adjustable, such as on slides or tracks which allow the main body of the tool mounts 900 to be moved laterally relative to the rails 102.

As further illustrated in FIG. 10B, the tool mount 900 may include one or more tool or material mounts 1008. These tool or material mounts 1008 may comprise rods or pins (such as a carriage bolt) which can be selectively connected to the main body of the tool mount 900. When connected thereto, the tool or material mounts 1008 may extend upwardly, such as to pass through an aperture (such as an open or a slot) in the material, and away from the engagement members 1002. In one embodiment, the material mounts 1008 may be threaded at one or more portions thereof, such as at one end for engaging a corresponding threaded connector 1010 associated with the tool mount 900, or where the tool or material mount 1008 has a head and is extended upwardly through the tool mount 900 so that a free end of the tool or material mount 1008 is accessible, such as at an opposing end for engaging a nut 1012. In one example, a miter saw might be placed on the tool mounts 900, with the material mounts 1008 extending through corresponding passages through a base of the saw and with a nut 1012 connected to the top of each material mount 1008 for securing the saw to the tool mounts 900. In one embodiment, the size of the aperture in the mount 900, such as the slot, has a width that corresponds to the mount 1008 (such as the carriage bolt) that prevents the fastener from turning when the nut 1012 is applied (such as by engaging a head portion of the bolt)).

Figure 11:
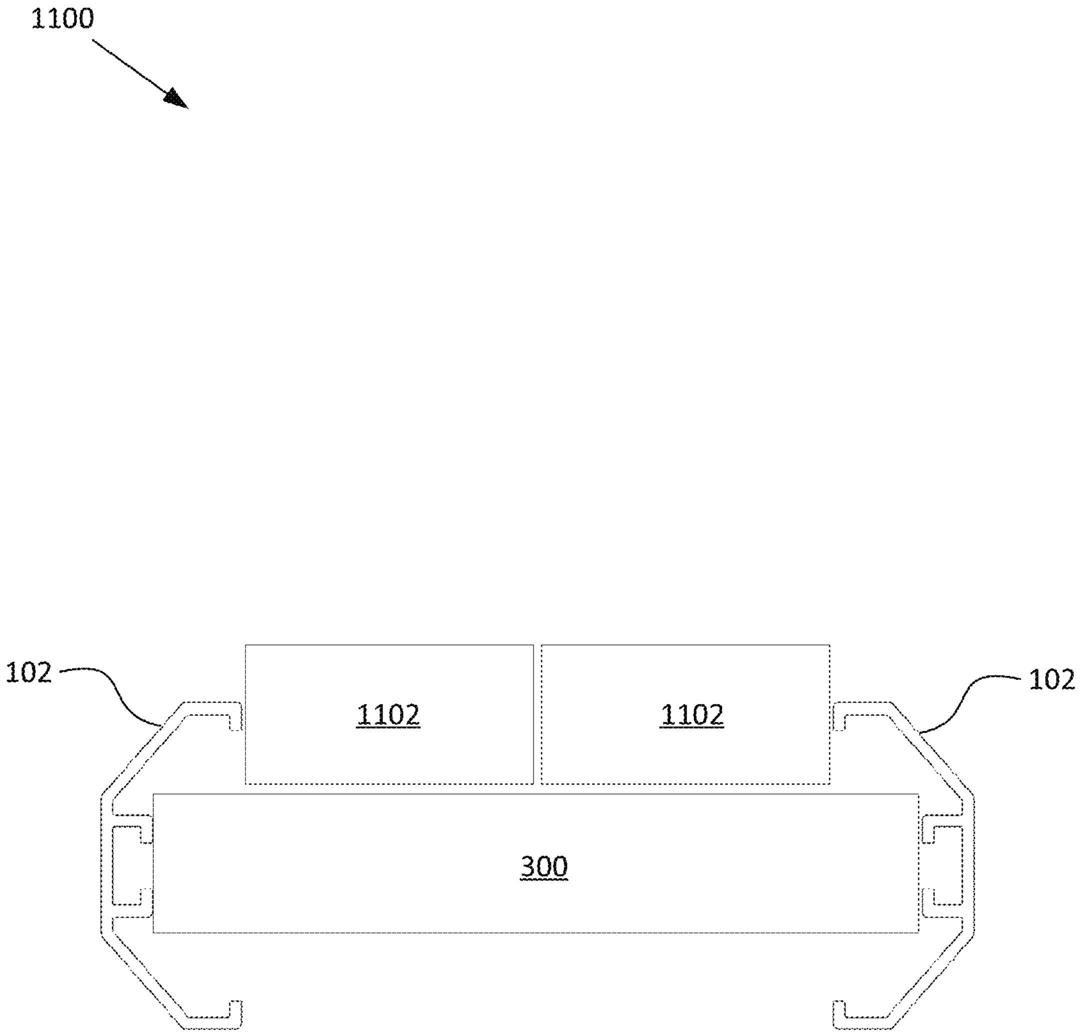
FIG. 11 is a diagram illustrating one embodiment of a work support in accordance with embodiments of the present disclosure.

FIG. 11 is a diagram illustrating one embodiment of a work support 1100 in accordance with embodiments of the present disclosure. In certain embodiments, the work support 1100 is configured to receive board members to form a disposable work surface. Often times it is necessary to cut a board on a work support, however, the act of cutting the board destroys the work surface because a cutting blade must extend entirely through the board to complete the cut. The cutting blade then also extends slightly into a work surface of a sawhorse, which damages the sawhorse. Beneficially, the work support 1100 is configured to receive a board member 1102 between the rails 102. The board member 1102 is supported by, in certain examples, the leg mount 204 or leg bracket 300.

The leg mount 204 and the leg bracket 300 cause the board member 1102 to extend upward above a top surface of the rails 102. Accordingly, a worker may then cut another piece of board on top of the board member 1102 without damaging the rails 102. The board member 1102 serves as a sacrificial work surface. In certain embodiments, the rails 102 are spaced apart a distance selected to receive a common 2×8 board member, or a pair of 2×4 board members. The board member 1102, in certain examples, is fastenable to either of the leg mount 204 or the leg bracket 300. In other examples, an end bracket engages the end of the board member 1102. In certain examples, the board members 1102 are held in place by a slight friction fit with the rails 102.

Figure 12A:
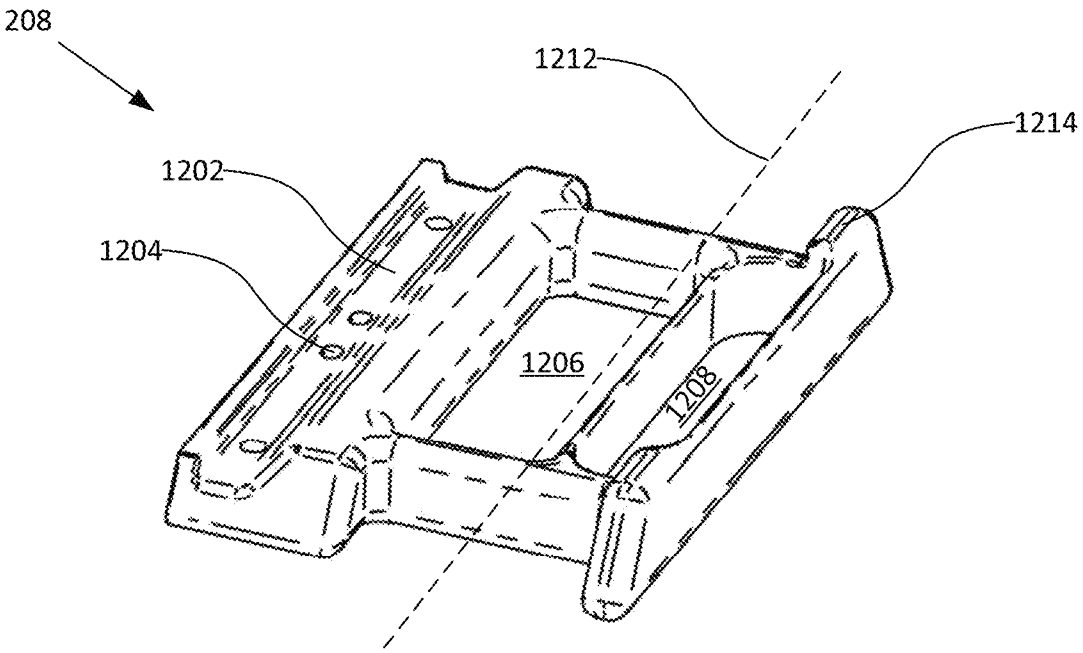
FIG. 12A is a perspective view diagram illustrating one embodiment of a side handle in accordance with examples of the present disclosure.

FIG. 12A is a perspective view diagram illustrating one embodiment of a side handle 208 in accordance with examples of the present disclosure. The side handle 208, in certain examples, is configured to fasten to a side of a rail 102. The side handle 208 includes a mounting surface 1202 having a shape to mate with the exterior bottom surface of the rail 102. Openings 1204 in the side handle 208 are configured to receive a fastener that couples the side handle 208 to the rail 102.

In certain examples, the side handle 208 is formed with openings 1206 and 1208. Opening 1206 is configured to receive a user's hand. Opening 1208 is configured to receive a tool. For example, a clip of a tape measure may be inserted into opening 1208. Additionally, the top surface of the side handle 208 may have a raised portion that is sized and configured to receive a board member. A board member may be placed horizontally across two side handles 208 in a manner similar to line 1212. Raised portion 1214 maintains the position of the board member on the side handle 208. This is useful for storing scrap pieces of wood. In certain examples, the opening 1206 is sized to receive a board member and hold the board member in a substantially vertical position, as opposed to the previously described horizontal position.

Figure 12B:
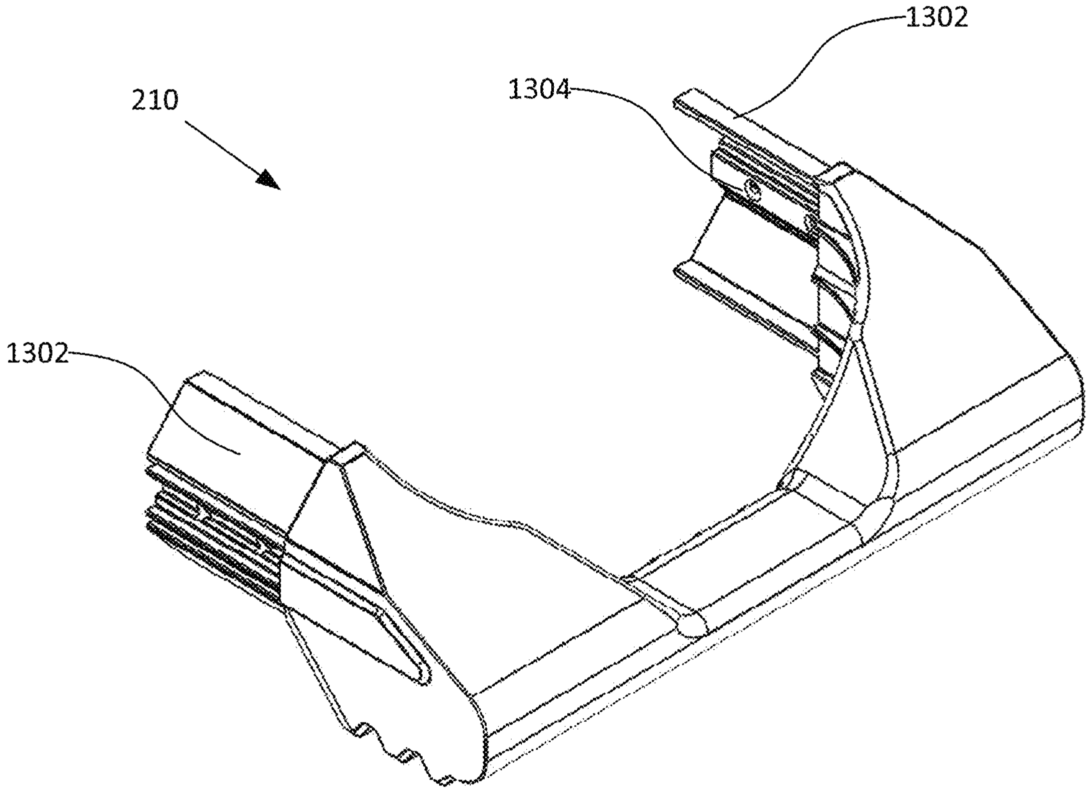
FIGS. 12B and 13 are perspective view diagrams illustrating one embodiment of the end handle in accordance with examples of the present disclosure.
Figure 13:
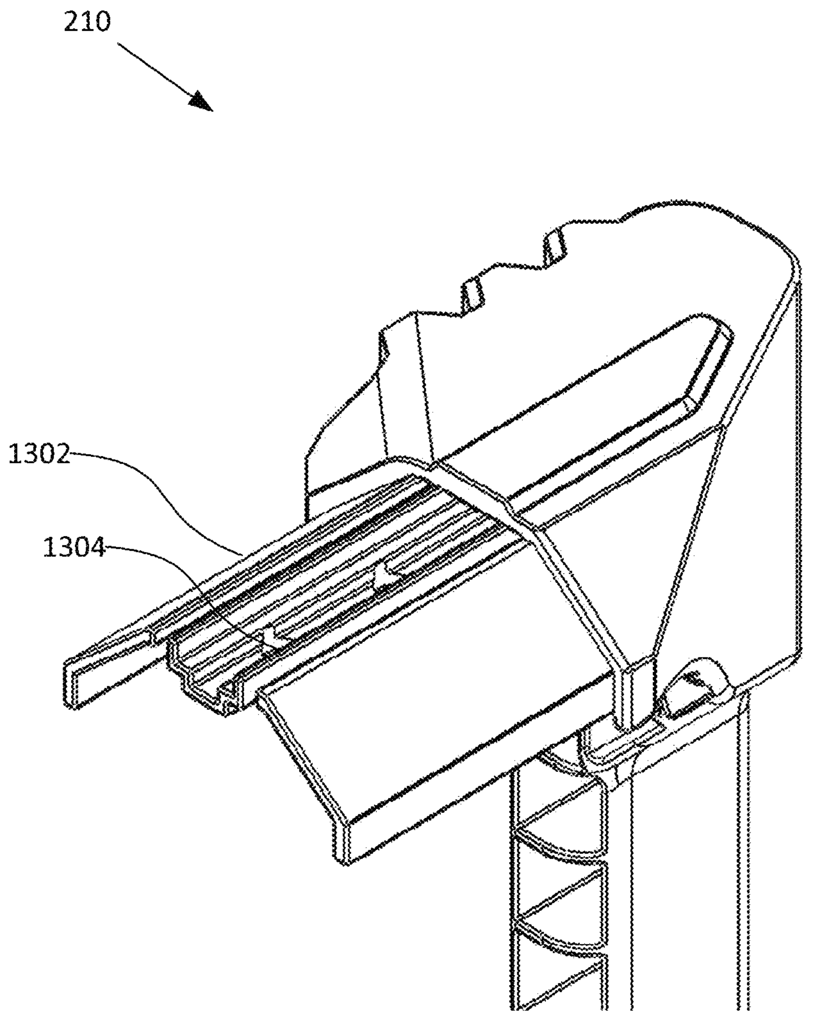

FIGS. 12B and 13 are perspective view diagrams illustrating one embodiment of the end handle 210 in accordance with examples of the present disclosure. The end handle 210 is configured to insert into ends of the rails 102 and space apart the rails 102 a predetermined distance. The distance, as described above, is selected to accommodate a board member or multiples of board members. In other words, the predetermined distance is a multiple of 3.5 inches (the actual width of a 2×4). In certain examples, the board member is a standard 2×8 piece of lumber. The ends 1302 of the side handle 210 are configured with a C-shaped cross-sectional profile configured to slidingly engage the interior surface of the rails 102. Each side handle 210 includes a pair of ends 1302 for engaging a pair of rails 102. Openings 1304 in the ends 1302 of the rails are configured to align with openings in the rails 102, through which fasteners may pass and secure the end handles 210 to the rails. Each work support 100, in certain examples, includes a pair of end handles 210 at opposing ends of a pair of rails 102. The end handle 210 may be provided with any configuration of ends 1302 to match any cross-sectional profile of rail 102. In additional examples, the ends 1302 of the end handle 210 may be configured with a T-shape insert for mating with the T-track of the rails 102.

Figure 14:
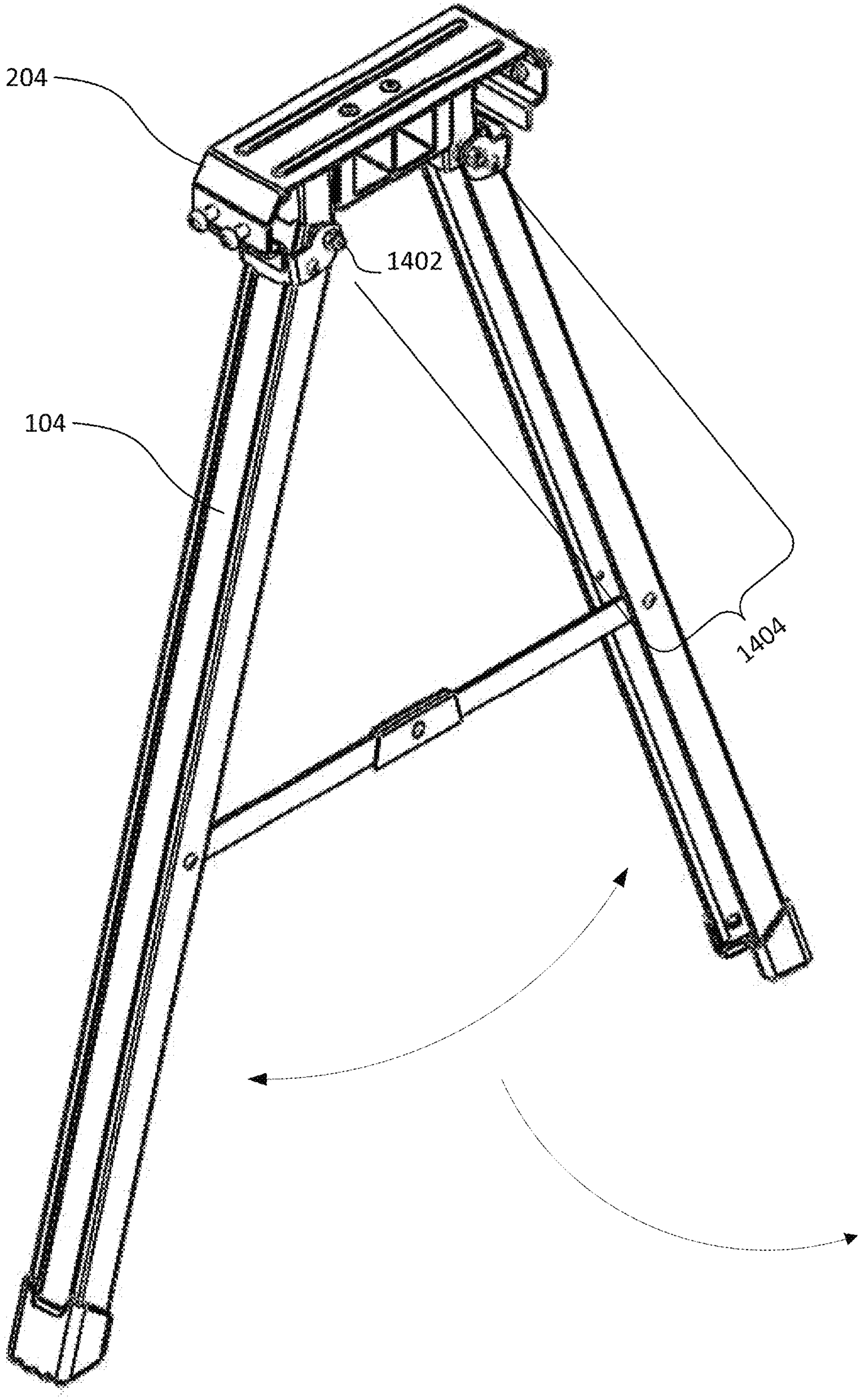
FIG. 14 is a perspective view diagram illustrating one example of a leg assembly (leg mount and legs), in accordance with examples of the present disclosure.

FIG. 14 is a perspective view diagram illustrating one example of a leg assembly (leg mount 204 and legs 104), in accordance with examples of the present disclosure. The leg mount 204, as described above, is shaped with ends configured to mate to the interior surfaces of the rails 102. Fasteners may extend through the rails 102 into the ends of the leg mount to secure the leg mount 204 to the rails. The width of the leg mount 204 is selected to accommodate, in certain examples, the width of a board member. The leg mount 204 is provided with a pivot mount for allowing the legs 104 to pivot in a longitudinal direction. In other words, the legs 104 are configured to collapse towards each other, and then pivot into a cavity formed by the rails 102.

In certain embodiments, the pivoting mount points 1402 of the legs on the leg mount 204 are spaced apart a distance 1404 of between about 2 and 10 inches. This beneficially provides stability to the work support 100. Conversely, many common work supports have legs that are attached to the same pivot point which is less stable.

Figure 15A:
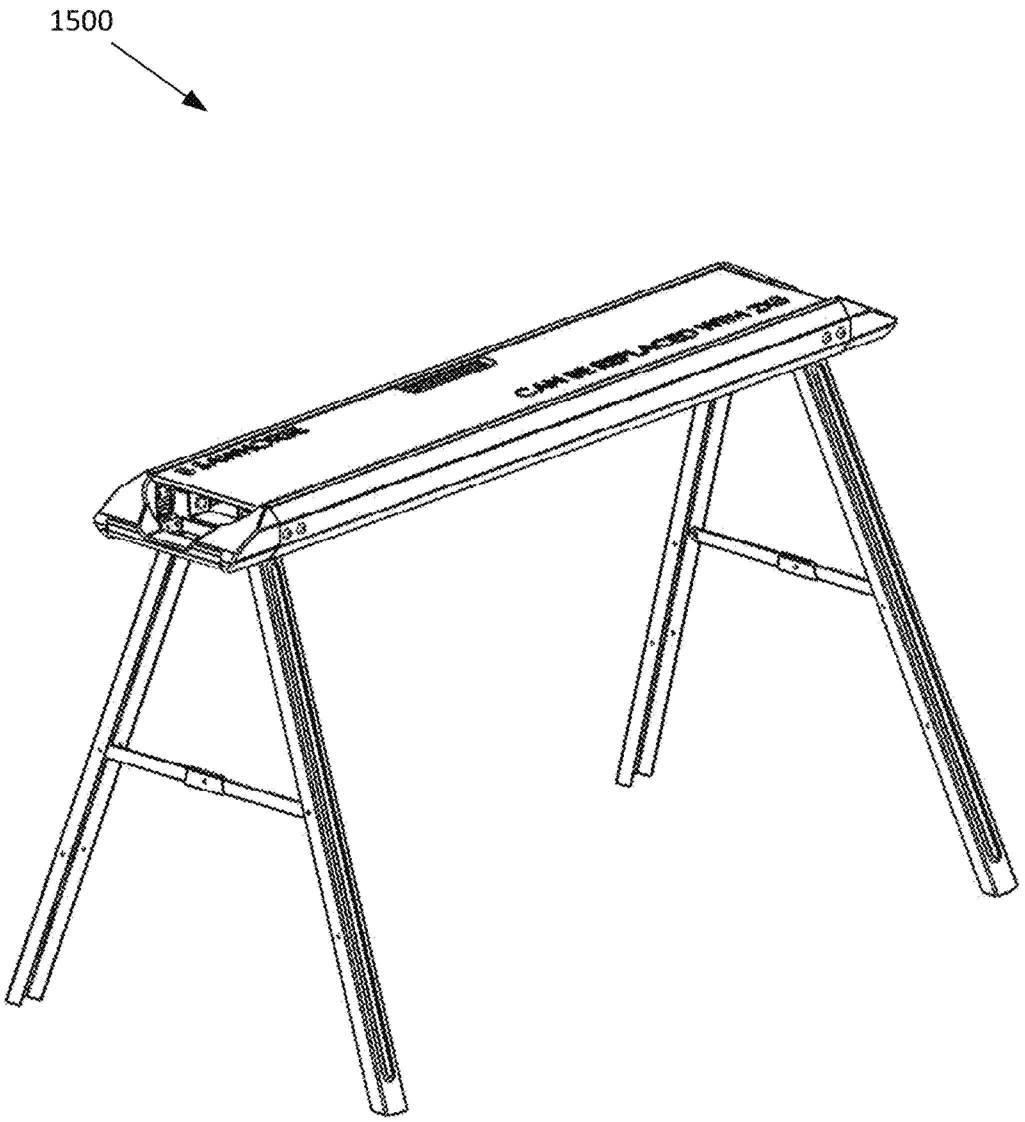
FIG. 15A is a perspective view diagram illustrating one example of a sawhorse configuration of the work support in accordance with examples of the present disclosure.

FIG. 15A is a perspective view diagram illustrating one example of a saw-horse configuration of the work support 1500 in accordance with examples of the present disclosure. As discussed above, the work support may be configured as a sawhorse with a work surface. The work surface, in certain examples, is a sacrificial board member such as a 2×8. In other examples, the work surface is coupled to the work support 1500.

Figure 15B:
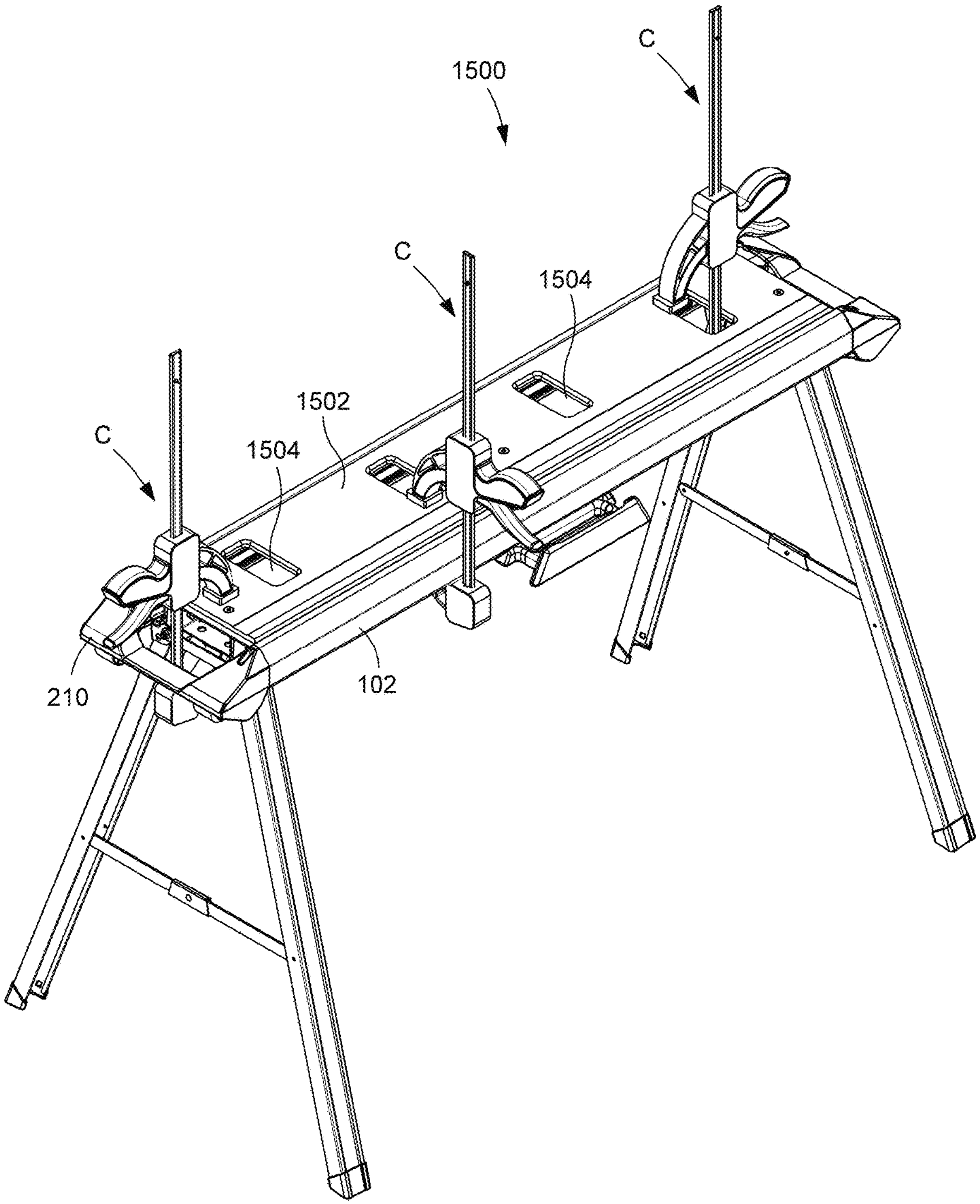
FIG. 15B is a perspective view diagram illustrating an embodiment of the present disclosure where the stand is configured as a clamping stand.

FIG. 15B is a perspective view diagram illustrating a clamping stand configuration of the work support 1500 in accordance with examples of the present disclosure. As discussed above, the work support may be configured to secure objects, such as via on or more clamps. Thus, clamps and a planar work surface, as shown in FIG. 15B, cooperate with the elongated rails 102.

As illustrated, in this embodiment, the work support 1500 may include a modified work surface 1502 (which may be removably secured to the rails 102, such as in replacement of the work surface 502 illustrated in FIG. 5 or the work surface illustrated in FIG. 15A.

In this embodiment, the work surface 1502 may cooperate with the rails 102 and handles 210 in order to define a generally planar surface of the work support 1500. The work surface 1502 may have one or more apertures or openings 1504 therein, such as extending there through from a top surface to a bottom surface thereof. The openings 1504 may be varied in number and location. So configured, the work support 1500 may be configured to accept clamps C or other securing or joining devices, including in a variety of locations and orientations. For example, as illustrated in FIG. 15B, clamps C may be mounted so that clamping rods thereof extend through the handles 210 or through the openings 1504, thus allowing the jaws of the clamp to engage the stand above and below the work surface 1502. In addition, clamps may be located along the sides of the work support 100, again permitting the jaws of the clamp to engage stand at the top and bottom of the work surface 1502, and also providing a third point of contact with the work support 100—of the clamp rod with the rail 102.

Figure 16:
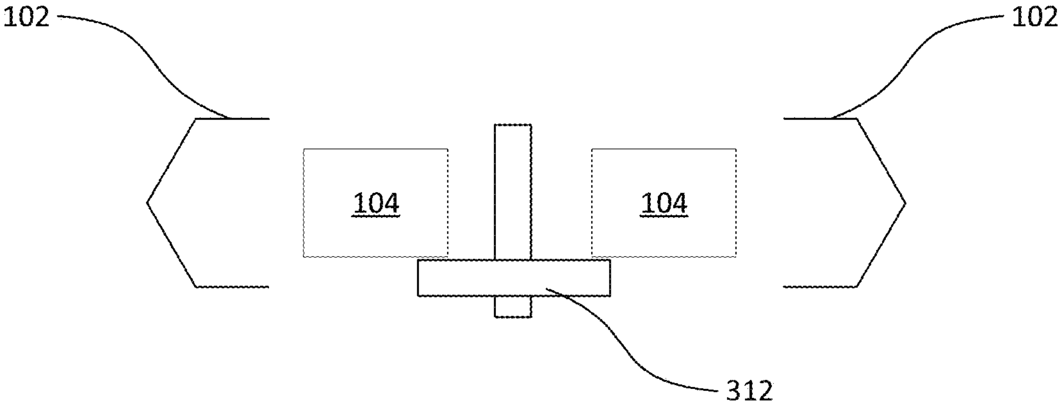
FIG. 16 is a schematic block diagram illustrating one embodiment of the work support in accordance with examples of the present disclosure.
Figure 17A:
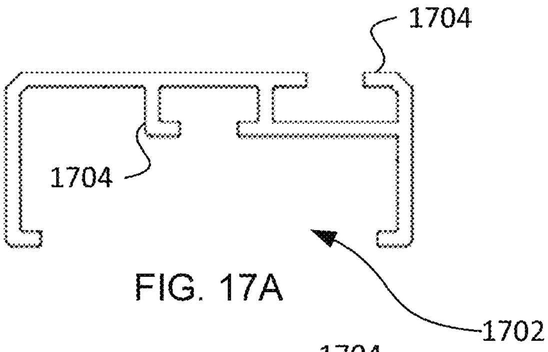
FIGS. 17A-17E are cross-sectional diagrams illustrating rails, according to examples of the subject disclosure.
Figure 17B:
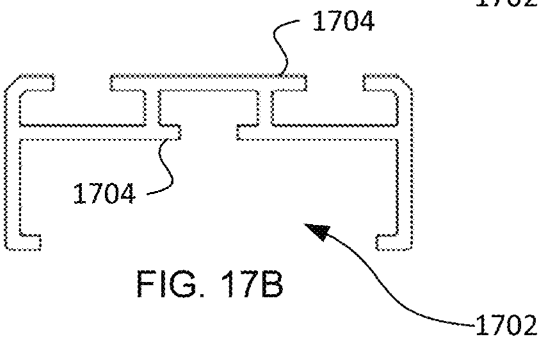
Figure 17C:
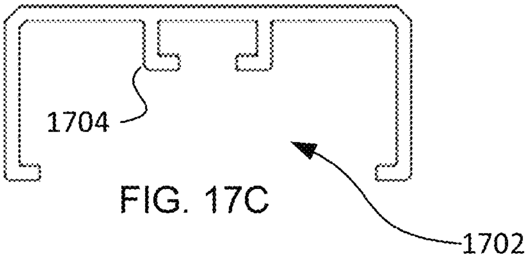
Figure 17D:
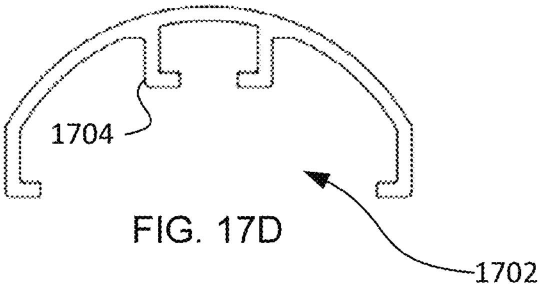
Figure 17E:
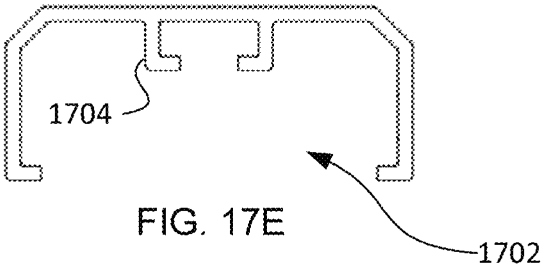
Figure 18E:
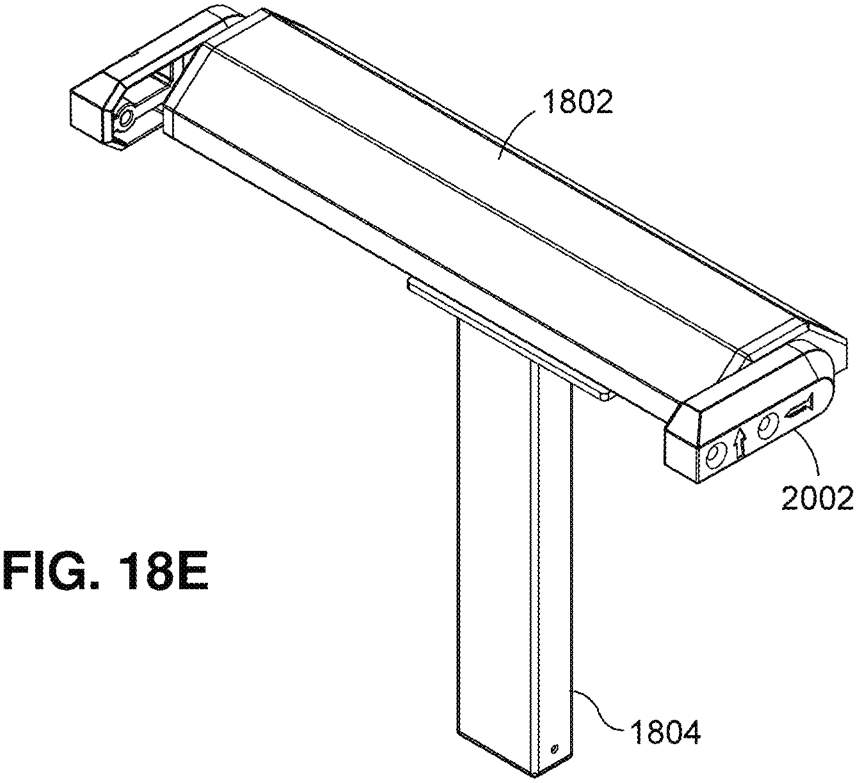
Figure 18F:
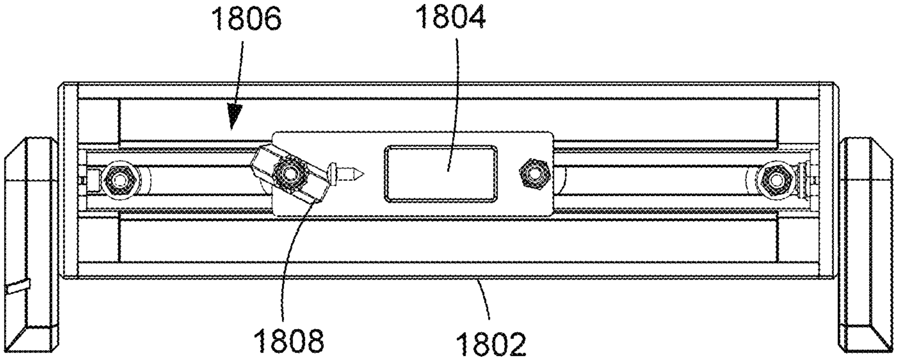
Figure 19A:
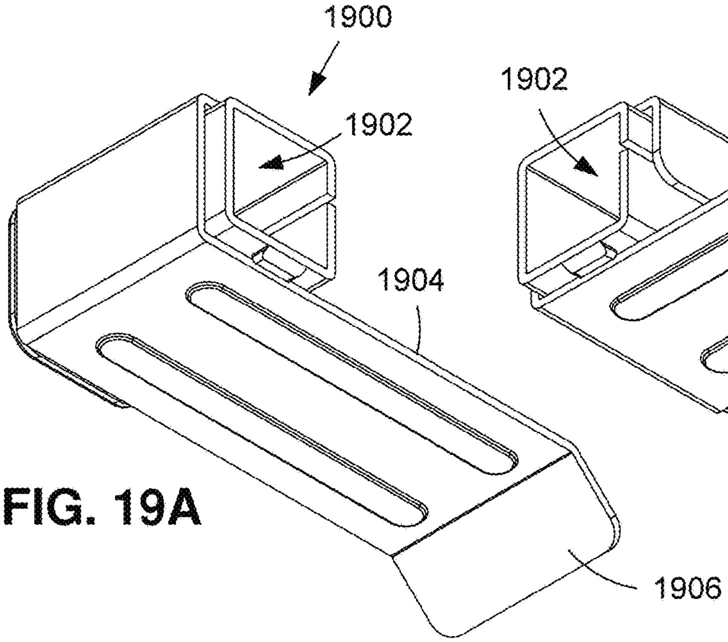
FIGS. 19A-19G illustrates a long material support in accordance with an embodiment of the present disclosure.
Figure 19B:
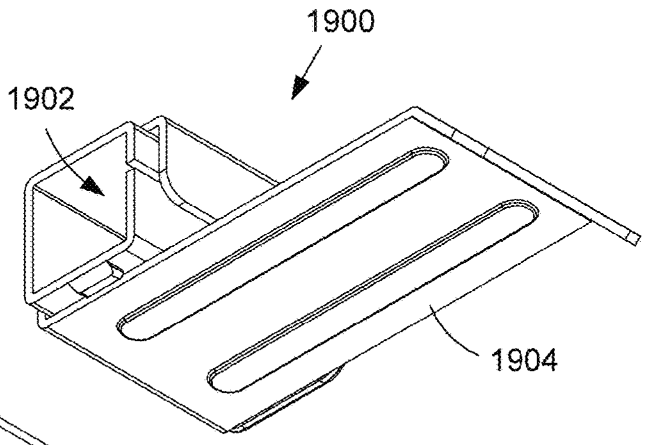
Figure 19C:
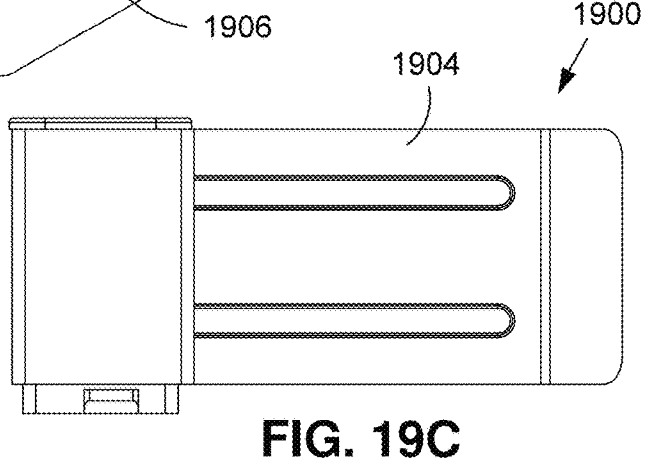
Figure 19D:
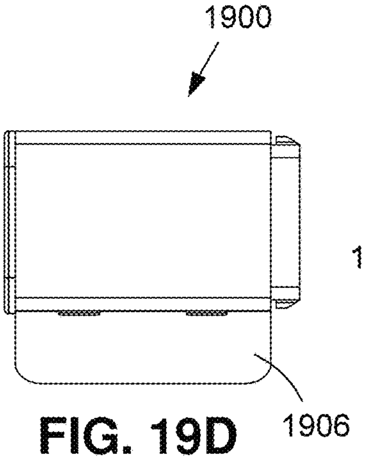
Figure 19E:
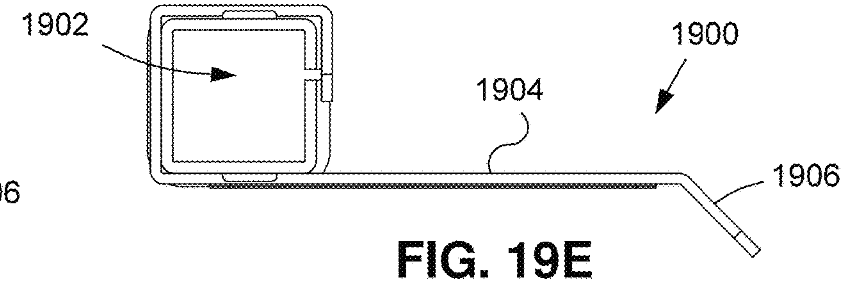
Figure 19F:
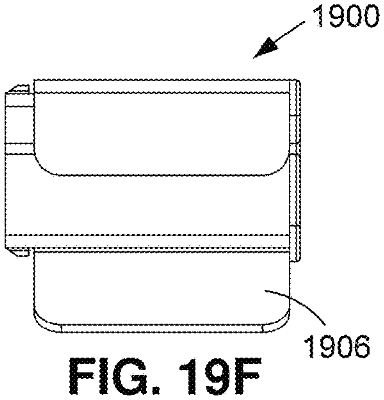
Figure 19G:
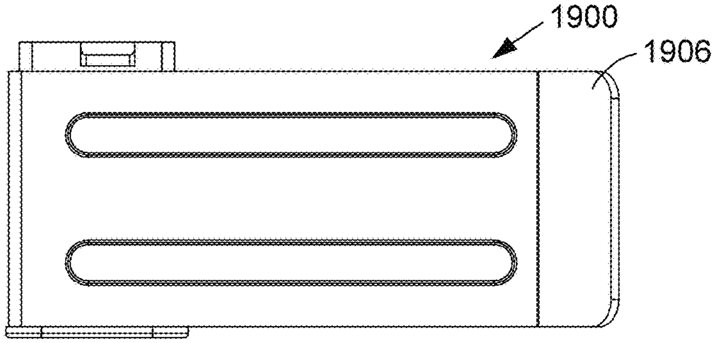

FIG. 16 is a schematic block diagram illustrating one embodiment of the work support 100 in accordance with examples of the present disclosure. The depicted embodiment illustrates the legs 104 in the folded or storage position, as opposed to the extended or working position described above (see also FIG. 1). The legs 104 pivot into a cavity formed by the rails 102. The legs 104 may be secured in place by the butterfly handle 312. Advantageously, in one embodiment, the handle 312 may be both used to secure the slidable support 206 and the legs 104 in a collapsed position. In other words, the handle 312 is movable between a first position corresponding to the extendable workpiece support and the pair of support legs 104 being secured in the collapsed position, and a second position corresponding to the extendable workpiece support and the pair of support legs 104 being released.

In one embodiment, the handle 312, when turned to a first position, both engages and locks the slidable support 206 into a fixed position and is rotated to the position illustrated in FIG. 16, wherein it also secures the legs 104 when they are in a collapsed position. In one embodiment, the handle 312 may be configured to move between engaged and disengaged positions by a simple quarter turn (e.g. a 90 degree change in position), whereby when the handle 312 is moved 90 degrees from its position as illustrated in FIG. 16, the handle 312 no longer secures the legs 104 and releases the slidable support 206.

FIGS. 17A-17E are cross-sectional diagrams illustrating rails, according to examples of the subject disclosure. In the depicted examples, the rail 102 described above with reference to other figures herein may be replaced with many variations of cross-sectional profiles. In each example, however, the interior side 1702 of each rail preferably includes a T-track 1704. Exterior surfaces may be planar, or substantially planar (e.g., FIGS. 17A, 17B, 17C, and 17E) or curvilinear (e.g., FIG. 17D). The exterior surfaces may include one or more T-tracks 1704 which are useful for attaching accessories, as described above.

As illustrated in FIGS. 2 and 5, the work support 100 includes a slidable or extendable workpiece support 206. The extendable workpiece support 206 is preferably extendable from at least one of a first and second end of the work support, wherein the rails 102 extend between the ends. As illustrated in more detail in FIGS. 18A-18F, the slidable workpiece support 206 may comprise a third elongated rail 207 that can be extended in and out relative to the work support 100 (e.g., is axially movable between extended and retracted positions), and also a first or primary material support 1800. The first or primary material support 1800 is preferably supported by the third elongated rail 207, such as by connection at an end thereof, and is movable both laterally and axially relative to the third elongated rail 207.

As illustrated, the primary material support 1800 may comprise a support body 1802 which may define one or more surface for supporting material, such as lumber, etc. In one embodiment, the height of the support body 1802 may be adjustable relative to the third elongated rail 207, such as by mounting the support body 1802 on an extension 1804 that can be adjusted relative to a mount that is connected to the third elongated rail 207 (such as with a locking/unlocking member, such as a set screw which can be used to lock and unlock the position of the extension 1804, such as relative to a mount 1805-see FIGS. 18A and 18B), thus allowing the position of the support body 1802 to be raised and/or lowered relative to the work support 100.

More importantly, as illustrated in FIGS. 18D and F, the position of the support body 1802 may be changed laterally relative to the third elongated rail 207, such as where the support body 1802 is centered relative thereto, or is extended to one side or the other. As illustrated, in FIG. 18F, the bottom of the support body 1802 may define or include a track 1806. The vertical extension 1804 is preferably configured to engage the track 1806, such as at the top of the extension 1804, thus allowing the support body 1802 to be slid back and forth relative to the extension 1804. Further, a means for locking or securing the position of the support body 1802 may be provided. This means may comprise a locking member (e.g., a locking screw 1808) that can be extended through a body at the top of the extension 1804 and into engagement with the support body 1802. The screw or other mechanism 1808 may be actuated by a paddle or the like.

As described in more detail below and illustrated in FIG. 18A, at least one stop or bumper 2002 may be associated with the support body 1802.

As illustrated in FIG. 18A, the work support 100 may also comprise a secondary or long material support 1900. In one embodiment, this material support 1900 is configured to be connected to the work support 100, preferably the slidable workpiece support 206, and most preferably the third elongated rail 207 thereof.

As illustrated in FIGS. 19A-G, the second material support 1900 may comprise a sleeve 1902 which is designed to accept the third elongated rail 207, and support element 1904 connected to the sleeve 1902. The support element 1904 may comprise, for example, a generally planar body which, when the material support 1900 is mounted on the third elongated rail 207, defines a generally horizontal support surface. In one embodiment, one end of the support element 1904 may form an upwardly extending stop or bumper 1906, such as to aid in keeping material from falling off of the support element 1904. Furthermore, as shown in FIG. 19, the sleeve member 1902 receives the third elongated rail 207.

As illustrated in FIG. 19, the material support 1800 may be positioned along the slidable workpiece support 206 (such as the third elongated rail 207 thereof), including by sliding it to different positions. In some embodiments, the material support 1800 may include a means for fixing its position relative to the slidable workpiece support 206 (e.g., a locking member such as a set or thumb screw, locking pin, etc.). In one embodiment, the second material support 1900 may extend out from the third elongated rail 207 in just one direction, but in others, it might extend outwardly in both directions).

Figure 20:
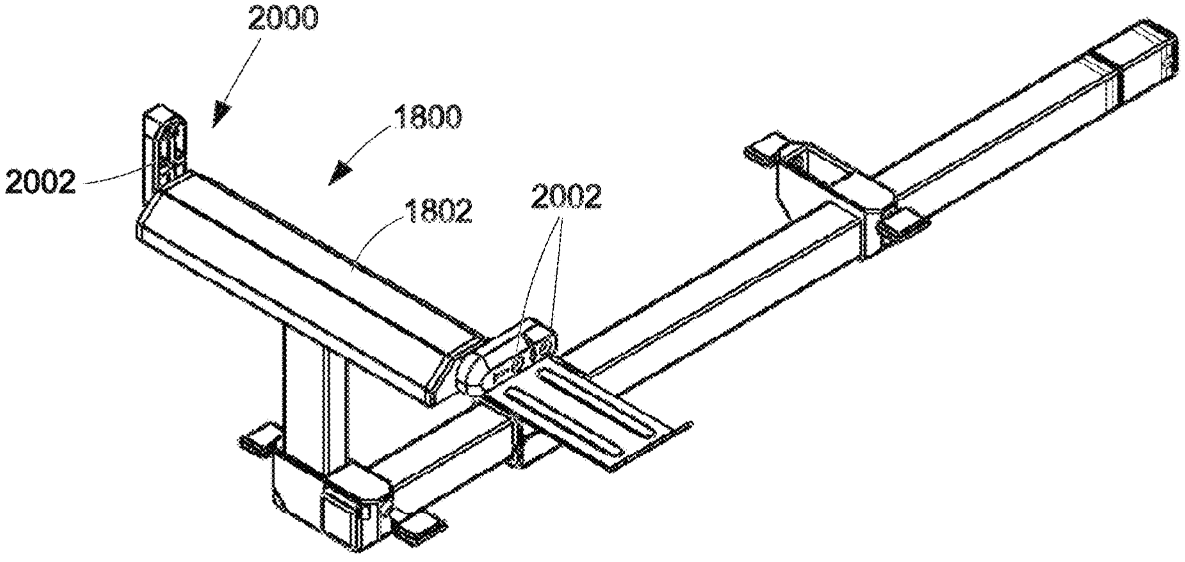
FIG. 20 illustrates aspects of material support bumpers in accordance with an embodiment of the present disclosure.

As illustrated in FIG. 20, in one embodiment, the primary material support 1800 may include a planar work surface and one or more support bumpers 2000 extending outwardly therefrom and being configured to keep material from falling off of the material support 1800. In one embodiment, a support bumper 2000 is located at one or both ends of the support body 1802. The support bumper 2000 may be rotatably connected to the primary material support 1800, and preferably the support bumper 2000, so as to be rotatable to at least two different positions. In one embodiment, the support bumper 2000 may be rotated so that it extends upwardly beyond a top of the support body 1802, thus forming a stop at the end(s) of the support body 1802, such as for preventing material from sliding off of the support body 1802. The support bumper 2000 can also preferably be rotated to a position in which it does not extend above the top of the support body 1802, thus allowing a user to easily slide material on and off the support body 1802. In one embodiment, the support bumper 2000 may, for example, be rotatably connected at or near one end thereof.

In one embodiment, one or more apertures 2002, such as two vertically aligned apertures, may be provided in the support bumper 2000. The user may pass fasteners (such as nails, screws or the like) through those apertures 2002 and into material which is supported by the support body 1802, thus securing the material to the primary material support 1800.

Figure 21:
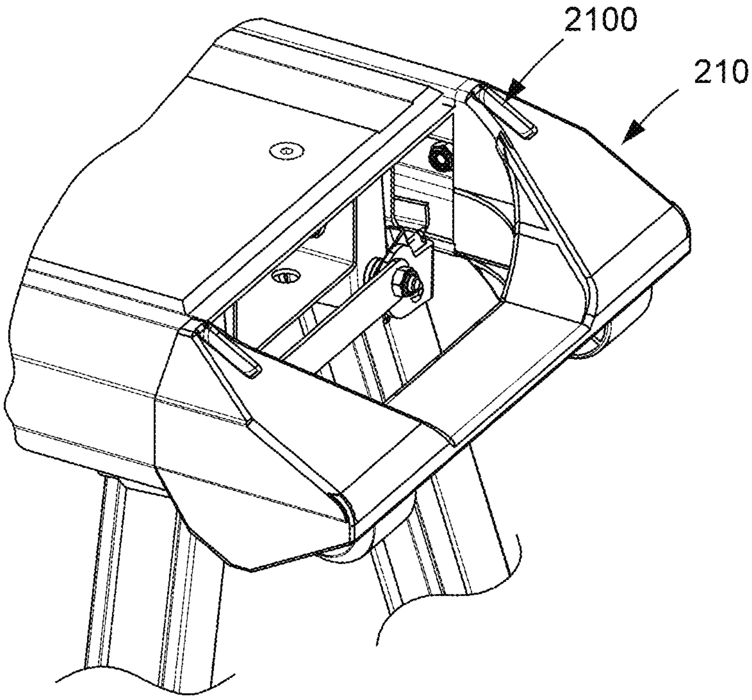
FIGS. 21-22 illustrates aspects of a connection feature for stacking of work supports and wheels in accordance with an embodiment of the present invention.

In one embodiment, work supports of the invention may be configured to stack for storage. The work supports may thus include a means for connecting or joining two work supports, such as in a stacked orientation. Referring to FIG. 21, the top of the end handle 210 may include at least one slot 2100. Further, the bottom of each end handle 210 may include at least one corresponding tab 2102. When a work support is collapsed for storage (e.g. with the legs folded in), the work support may be stacked on top of another work support. In the stacked orientation, the downwardly extending tab 2102 on the top work support preferably fits into a corresponding slot 2100 in the work support there below. This links the two work supports together (of course, more than two work supports 100 might be vertically stacked in this connecting manner). In other words, multiple work supports are able to be nestable when not in use, thereby providing shipping and storage improvements.

Figure 22:
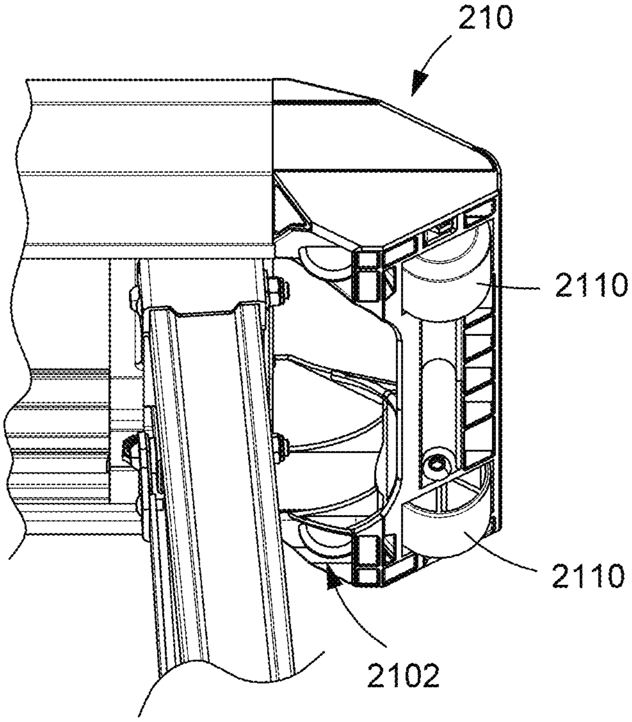

Further, as illustrated in FIG. 22, one or more wheels 2110, rollers or the like, may be associated with the work support 100. In one configuration, the wheels 2110 are located at one or both ends thereof, such as at the bottom of the handle 210. This allows the work support 100 to be picked up with the handle at one end and rolled along a surface via the wheels 2110 at the other end.

It will be appreciated that the various features described above may be utilized in association with a work support or the invention, whether the work support is configured as a work stand or tool support, a sawhorse, a material support, a clamping support or otherwise.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A work support comprising:

a pair of support legs;

a first elongated rail and a second elongated rail each extending between and being coupled to the pair of support legs and spaced apart from one another;

an extendable workpiece support comprising a third elongated rail and a material support supported by the third elongated rail; and a leg bracket coupled to a first support leg of the pair of support legs, the leg bracket comprising a first closed end, a second closed end opposite the first closed end, a first passage and a second passage, and a first channel and a second channel each disposed on an opposing side of the first and second passages, the first channel and the second channel each being configured to receive one of the pair of support legs when the pair of support legs are in a collapsed, storage position such that the pair of support legs in the storage position are each disposed between a corresponding one of the first and second passages, and a corresponding one of the first and second elongated rails, the first and second passages each being between the first and second closed ends, the first and second closed ends each being formed to mate with an interior surface of a corresponding one of the first and second elongated rails, the third elongated rail being mounted within and extending through one of the first or second passages so that the third elongated rail extends between the first and second elongated rails.

2. The work support according to claim 1, further comprising:

a tool mount comprising:

a body for supporting at least one tool, the body spanning the first and second elongated rails and being oriented transverse with respect thereto, a first engagement member and a second engagement member each coupled to the body, and a drive mechanism coupled to the body, wherein the first engagement member has a first engaging face facing in a first direction, wherein the second engagement member has a second engaging face facing in a second direction opposite the first direction, wherein the drive mechanism is structured to move at least one of the first and second engagement members away from the other of the first and second engagement members and into engagement with an interior of a corresponding one of the first and second elongated rails in a press fit manner in order to mount the tool mount to the first and second rails.

3. The work support according to claim 1, further comprising a central member extending between the first and second elongated rails, and a fastener, the fastener being movable from a disengaged position in which the fastener does not engage either of the first and second elongated rails, and an engaged position in which the fastener engages one of the first and second elongated rails.

4. The work support according to claim 1, further comprising one or more clamps and a planar work surface cooperating with the first and second elongated rails, wherein the work surface has one or more openings, wherein the one or more clamps each having a portion extending through a corresponding one of the one or more openings, thereby allowing jaws of the one or more clamps to engage a top and a bottom of the planar work surface.

5. The work support according to claim 1, further comprising an end handle coupled to the first and second elongated rails, wherein the end handle has a top portion and a bottom portion disposed opposite the top portion, wherein the top portion has a number of slots, and wherein the bottom portion has a number of tabs each configured to extend into a corresponding slot of another end handle in order to allow the work support and another work support to be nestable when not in use.

6. The work support according to claim 1, wherein the material support is movable laterally and axially relative to the third elongated rail, wherein the third elongated rail is axially movable between extended and retracted positions, wherein the first and second closed ends of the leg bracket are each generally C-shaped, and wherein each of the first and second closed ends of the leg bracket comprises a T-shaped member formed as part of the leg bracket and configured to mate with a T-shaped channel of a corresponding one of the first and second elongated rails.

7. The work support according to claim 2, wherein the drive mechanism further comprises a lever and a rod rotatably coupled to the lever, wherein the rod is mounted to the first engagement member, and wherein rotation of the rod pulls the first engagement member toward the lever, thereby compressing the first engagement member into the first elongated rail and mounting the tool mount to the first and second elongated rails.

8. A work support comprising:

a first leg bracket and a second leg bracket, each leg bracket comprising a body having a top and a bottom, a first side and a second side, at least one passage for accepting a work piece support extension and a first channel between said first side and said at least one passage and a second channel between said second side and said at least one passage, said first and second channels located at said bottom side and opening away from said top side;

a first elongated rail and a second elongated rail spaced apart from one another and each having an upper edge, a lower edge, and a track therebetween, said first elongated rail extending between said first leg bracket and said second leg bracket and mounted to said first side of each of said first and second leg brackets and said second elongated rail extending between said first leg bracket and said second leg bracket and mounted to said second side of each of said first and second leg brackets;

a first pair of legs rotatably mounted to said first leg bracket between an extended position and a collapsed position, a first leg of said first pair of legs extending through said first channel of said first leg bracket and a second leg of said first pair of legs extending through said second channel of said first leg bracket when said first pair of legs is in said collapsed position; and a second pair of legs rotatably mounted to said second leg bracket between an extended position and a collapsed position, a first leg of said second pair of legs extending through said first channel of said second leg bracket and a second leg of said second pair of legs extending through said second channel of said second leg bracket when said second pair of legs is in said collapsed position;

whereby said at least one passage, said first channel, and said second channel are disposed vertically between said upper edges and said lower edges and laterally between said tracks.

9. The workpiece support according to claim 8, further comprising the first workpiece support extension, which extends through said at least one passage in said first leg bracket outwardly in a direction opposite of said second leg bracket, and a second workpiece support extension extending through said at least one passage in said second leg bracket outwardly in a direction opposite of said first leg bracket.

* * * * *